United States Patent
Sivanesan et al.

(10) Patent No.: US 10,581,549 B2
(45) Date of Patent: Mar. 3, 2020

(54) ENHANCED OVERLAID CODE DIVISION MULTIPLE ACCESS (CDMA)

(71) Applicant: INTEL CORPORATION, Santa Clara, CA (US)

(72) Inventors: Kathiravetpillai Sivanesan, Portland, OR (US); Yaser Fouad, North Plains, OR (US); Vesh Raj Sharma Banjade, Hillsboro, OR (US); Joonbeom Kim, San Jose, CA (US); Balkan Kecicioglu, Hillsboro, OR (US); Yanzeng Fu, Xi'an (CN); Rath Vannithamby, Portland, OR (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 15/573,377

(22) PCT Filed: Dec. 24, 2015

(86) PCT No.: PCT/US2015/000355
§ 371 (c)(1),
(2) Date: Nov. 10, 2017

(87) PCT Pub. No.: WO2016/200358
PCT Pub. Date: Dec. 15, 2016

(65) Prior Publication Data
US 2018/0109346 A1   Apr. 19, 2018

Related U.S. Application Data

(60) Provisional application No. 62/174,249, filed on Jun. 11, 2015.

(51) Int. Cl.
*H04J 13/00* (2011.01)
*H04W 72/04* (2009.01)
(Continued)

(52) U.S. Cl.
CPC ....... *H04J 13/0003* (2013.01); *H04W 52/241* (2013.01); *H04W 72/0446* (2013.01); *H04W 74/0841* (2013.01)

(58) Field of Classification Search
None
See application file for complete search history.

(56) References Cited

U.S. PATENT DOCUMENTS 9,185,690 B2 * 11/2015 Khoshnevis ........ H04W 72/042
2010/0157927 A1 * 6/2010 Mochizuki ............ H04L 1/1685
370/329

(Continued)

OTHER PUBLICATIONS

3GPP TSG-GERAN Meeting #62 (GP-140421); New Study Item on Cellular System Support for Ultra Low Complexity and Low Throughput Internet of Things; VODAFONE Group Plc; Valencia, Spain; May 26-30, 2014.

(Continued)

*Primary Examiner* — Kevin D Mew

(57) ABSTRACT

A base station can obtain channel quality conditions for mobile devices in a scheduling interval and identify a channel quality, a target transmission scheme, and a transmission power level for each of the mobile devices. The base station can assign a unique orthogonal CDMA code and can force the mobile devices to transmit K repeated bursts of uplink data such that each of the mobile devices has a rotated phase shift based on the unique orthogonal CDMA code assigned to each of the mobile devices with each of the mobile devices multiplexed on a same physical channel using an overlaid CDMA operation. The base station can process K repeated bursts that are multiplexed on the same physical channel using the overlaid CDMA operation. The base station can separate the mobile devices according to the unique orthogonal CDMA code and use IQ accumulation according to combine the K repeated bursts.

23 Claims, 13 Drawing Sheets

(51) Int. Cl.
  *H04W 52/24*  (2009.01)
  *H04W 74/08*  (2009.01)

(56) References Cited

U.S. PATENT DOCUMENTS

| | | | | |
|---|---|---|---|---|
| 2010/0272004 | A1* | 10/2010 | Maeda | H04L 5/0007 370/312 |
| 2010/0279628 | A1* | 11/2010 | Love | H04L 5/003 455/70 |
| 2011/0268069 | A1 | 11/2011 | Song et al. | |
| 2013/0064099 | A1* | 3/2013 | Kim | H04L 5/0053 370/241 |
| 2014/0192767 | A1* | 7/2014 | Au | H04W 74/0866 370/330 |
| 2015/0055584 | A1* | 2/2015 | Lee | H04W 72/042 370/329 |
| 2015/0341921 | A1* | 11/2015 | Chen | H04W 72/0413 370/330 |
| 2016/0007374 | A1* | 1/2016 | Lee | H04J 11/00 370/336 |
| 2017/0019886 | A1* | 1/2017 | Patel | H04W 4/70 |
| 2017/0135084 | A1* | 5/2017 | Kuchibhotla | H04L 5/0007 |
| 2018/0199359 | A1* | 7/2018 | Cao | H04L 1/189 |

OTHER PUBLICATIONS

3GPP TSG GERAN #63 (GP-140609); GSM Evolution for cellular IoT—Increasing UL capacity; Ericsson; Ljubljana, Slovenia; Aug. 25-29, 2014.

3GPP TSG GERAN #66 (GP-150355); EC-GSM, Overlaid CDMA for extended coverage; Ericsson; Vilnius, Lithuania; May 25-28, 2015.

3GPP TR 45.820 V1.2.1; Cellular System Support for Ultra Low Complexity and Low Throughput Internet of Things (Release 13); (May 2015).

* cited by examiner

300

| Transmission Scheme | MCS Level | Number of Blind Repetitions |
|---|---|---|
| Scheme 1 | MCS-4 | 1 |
| Scheme 2 | MCS-3 | 1 |
| Scheme 3 | MCS-2 | 1 |
| Scheme 4 | MCS-1 | 1 |
| Scheme 5 | MCS-1 | 2 |
| Scheme 6 | MCS-1 | 4 |
| Scheme 7 | MCS-1 | 8 |
| Scheme 8 | MCS-1 | 16 |

| Parameters | GERAN C-Iot |
|---|---|
| Frequency | 900MHz band |
| Bandwidth | 200 kHz (180 kHz) |
| Modulation coding Schemes | MCS 1-4 (GMSK + CC) |
| Inter site distances | 1.737 km |
| Channel Model | TU, 1 Hz Doppler |
| Antenna gains | 18 dBi / -4 dBi |
| Traffic Model | Full Buffer |
| Tx Power | 33 dBm |
| Noise Figure | 3 dB |
| Antennas | BS: GERAN direction (Am=20 dB, 65 degrees) device: Omni |
| Pathloss | $120.9 + 37.6\log_{10}(R)$, R in kilometers |
| Frequency reuse | 3 |
| Shadowing correlation distance | 110m (1 between sectors and 0.5 between site) |
| Number of Rx Antennas | 2 |
| Power ControL | $P_o + \alpha \cdot PL$, dBm, $\alpha = 0.8$ |
| Enhanced Overlaid CDMA | Enabled |

FIG. 6

ENHANCED OVERLAID CODE DIVISION MULTIPLE ACCESS (CDMA)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In addition, in wireless communication systems, it is common that a single base station transmits signals to a plurality of remote units. In order to combat the harsh multipath wireless transmission channel while providing signaling to a plurality of remote units, modulation and coding schemes, which provide efficient data transfer, as well as user channelization, have been developed. In general, these schemes operate most efficiently when each signal from a base station is transmitted with synchronized timing. For example, in a typical overlaid code division multiple access (CDMA) system, the signals are distinguished from one another through the use of different codes. In the case of transmissions from a base station to a remote unit, these codes are typically an orthogonal set of codes such as, for example, Walsh functions. If the transmissions corresponding to one orthogonal channel become misaligned with the transmissions corresponding to another channel, the orthogonal nature of the codes is degraded and the transmissions may significantly interfere with one another.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 illustrates a table of enhanced overlaid CDMA transmission schemes between a base station and a mobile device in accordance with an example;

FIG. 6 illustrates a table of simulation parameters for enhanced overlaid CDMA transmission schemes between a base station and a mobile device) in accordance with an example;

Figure 1:
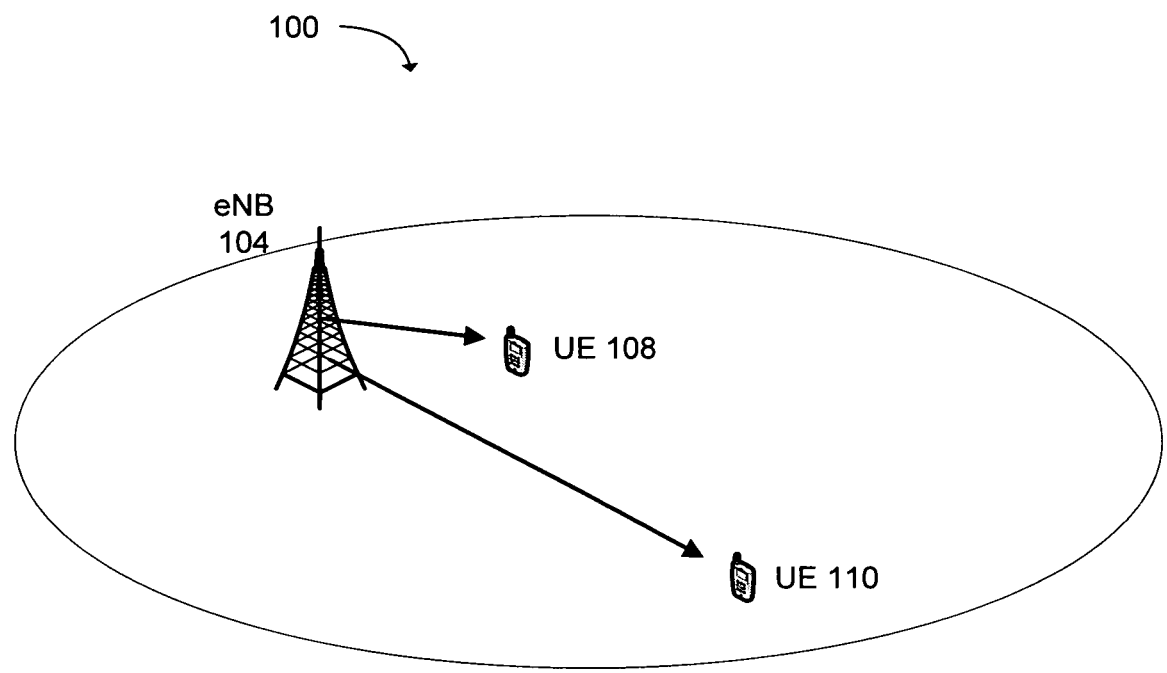
FIG. 1 illustrates a base station that is serving a first user equipment (UE) and a second UE in accordance with an example.

Reference will now be made to the exemplary embodiments illustrated, and specific language will be used herein to describe the same. It will nevertheless be understood that no limitation of the scope of the application is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

As described herein, an overlaid code division multiple access (CDMA) is provided for uplink (UL) extended coverage devices. This technique of overlaying CDMA can allow multiplexing of multiple mobile devices (e.g., user equipment) simultaneously on a same physical channel. Orthogonality between multiplexed mobile devices can be achieved through orthogonal codes. More specifically each mobile device can repeat its blocks and applies an assigned code sequence that is orthogonal to code sequences assigned to other users. The code sequence elements can be of unit amplitude and can be applied burst-wise, i.e. the code sequence elements correspond to applying a phase shift to each transmitted burst. At a receiver side (e.g., a mobile device) the received blocks can be phase shifted according to the complex conjugate of the same code sequence, followed by addition of the received samples. This can result in coherent accumulation of the desired signal and cancellation of the others. By applying different code sequences on the receiver side, the signals from the different users can be separated. In one aspect, the code sequences can be rows of a Hadamard matrix or a Fourier matrix.

Also, overlaid CDMA can multiplex several extended coverage devices. That is, a base station can force one or more mobile devices to blindly repeat the mobile devices' transmitted bursts in subsequent time slots, simultaneously on a same set of radio resources by utilizing orthogonal codes. In such scenarios, the orthogonal codes can be applied on repeated bursts in the form of phase rotations. For example, consider a scenario in which two extended coverage devices with 4 blind repetitions are being multiplexed. Before a one of the extended coverage devices transmitting its bursts in four time slots, the first extended coverage device can apply 4 phase shifts (such, as 0°, 180°, 0°, 180° degrees) to each of the mobile devices' 4 bursts. Similarly, the second extended coverage device can apply the phase shifts (0°, 0°, 0°, 0° degrees) to the 4 bursts of the second extended coverage device. At the receiver side, the received signal over the 4 time slots is buffered. Using this buffered signal, the transmitted bursts of the desired device can be easily recovered by applying complex conjugate phase rotations corresponding to the desired device's orthogonal code at the burst level on the 4 received bursts and then combining the corresponding samples of each of the 4 bursts. This yields the transmitted burst by a single device and nullifies the signals of the remaining overlaid bursts. Similarly, the transmitted bursts of another device can be obtained by 1) applying a complex conjugate phase rotation that correspond to device's sequence and 2) combining the corresponding samples of the received bursts. Hence, using overlaying CDMA can result in a significant increase in the channel throughput in the slots reserved for blind repetitions.

However, there are three major challenges that may impede the potential gains of overlaying CDMA. First, limiting the number of blind repetitions (e.g., bursts) and overlaying CDMA to mobile devices experiencing unfavorable channel conditions can significantly limit the potential gains of overlaying CDMA. For instance, if a device with modulation and coding scheme (MCS) level 1 is enforced to implement 8 blind repetitions, it can instead utilize MCS level 4, which results in an 84% gain in its data throughput. However, this feature is not available in legacy systems.

Second, maintaining the orthogonality between the mobile devices' transmissions necessitates that the multiplexed devices are selected such that they utilize a same number of blind repetitions. However, finding and locating such device pairs decreases computing efficiency given that the number of devices implementing blind repetitions at a given time slot is limited. Subsequently, the absence of an adequate number of pairs can result in a significant decrease in the potential gains of the proposed overlaid CDMA technique.

Third, mobile devices implementing blind repetitions can experience unfavorable channel condition and thus the mobile devices are bound to transmit at full power. Subsequently, in cases wherein CDMA codes are not perfectly orthogonal, e.g. due to frequency and timing offsets, the residual interference between the mobile devices due to the power leakage between overlaid devices can significantly degrade the mobile devices' performance, such as reducing the mobile devices' throughput or increasing the block error rate (BLER). To mitigate this challenge, a successive interference cancellation (SIC) receiver scheme can be used to eliminate the effect of the mutual interference between the overlaid devices. However, SIC may not be sufficient to mitigate the interference due to the quality of the channel estimation may not be reliable since the extended coverage devices are experiencing unfavorable channel conditions. Also, devices in unfavorable channel conditions implement only enough blind repetitions so that the devices can reach a signal-to-interference-plus-noise ratio (SINR) threshold of the lowest MCS level. Subsequently, the received powers of all the mobile devices at the base station are comparable, i.e., generally around 3 decibels (dB). Hence, SIC may not be effective due to the absence of a dominant interferer.

Thus, to overcome these various challenges, a technology is provided for a global system for mobile (GSM)/enhanced data rates for GSM evolution (EDGE) radio access network (GERAN) based cellular of Internet of things (IoT) (CIoT), which can be referred to as an extended coverage GSM "EC-GSM" system, to enforce CIoT devices in favorable channel conditions to implement redundant blind repetitions. Configuring CIoT devices in favorable channel conditions to implement redundant blind repetitions can enable the IoT devices to be multiplexed over the same radio resources given that the IoT device are assigned orthogonal codes by the base station. In addition, these redundant blind repetitions can be utilized to either improve the transmission reliability or to increase the devices' throughput and subsequently the overall system throughput. That is, CIoT devices having channel quality conditions above a predefined threshold, as compared to the CIoT devices having channel quality conditions below the predefined threshold, can be forced to implement redundant blind repetitions to be multiplexed over the same radio resource.

In one aspect, a technology is provided for a base station operable to perform enhanced overlaid code division multiple access (CDMA) to increase uplink (UL) transmission capacity with a mobile device. The base station can obtain channel quality conditions for the mobile devices in a scheduling interval. The base station can identify a channel quality, a target transmission scheme, and a transmission power level for each of the mobile devices. The base station can assign a unique orthogonal CDMA code. The base station can force the mobile devices to transmit K repeated bursts of uplink data such that each of the mobile devices has a rotated phase shift based on the unique orthogonal CDMA code assigned to each of the mobile devices with each of the mobile devices multiplexed on a same physical channel using an overlaid CDMA operation. The base station can process K repeated bursts that are multiplexed on the same physical channel using the overlaid CDMA operation. The base station can separate the mobile devices according to the unique orthogonal CDMA code and use in-phase (I) and quadrature-phase (Q) (IQ) accumulation according to combine the K repeated bursts.

In one aspect, the base station can obtain channel quality conditions for mobile devices in a scheduling interval. The base station can identify a channel quality, a target transmission scheme, and a transmission power level for each of the mobile devices. The base station can assign each of the mobile devices a unique orthogonal CDMA code. The base station can instruct the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, wherein K is a positive integer that is equal to or greater than a number of the mobile devices that are to have an overlaid CDMA operation performed thereon. The base station can receive, from the mobile devices, the K repeated bursts that are each multiplexed a same physical channel for overlaying the CDMA. The base station can separate the mobile devices according to the unique orthogonal CDMA code and use In-phase/Quadrature (IQ) accumulation according to the K repeated bursts.

In an additional aspect, a technology is provided for a mobile device operable to perform enhanced overlaid code division multiple access (CDMA) to increase uplink (UL) transmission capacity with eNodeB. The mobile device can process a unique orthogonal CDMA code, received from an eNodeB that is assigned to the mobile device. The mobile device can repeatedly transmit K repeated bursts of UL data that are each rotated by a phase shift based on the unique orthogonal CDMA code. The mobile device multiplex each of the K repeated bursts of the mobile device with other UL transmission of alternative mobile devices on a same physical channel for overlaying the CDMA, K is a positive integer that is equal to or greater than the number of the mobile devices that have the overlaid CDMA, separate the mobile devices according to the unique orthogonal CDMA code and use in-phase (I) and quadrature-phase Q (IQ) accumulation according to combine the K repeated bursts, wherein signals of the mobile devices are separated at the receiver according to the unique orthogonal CDMA code and use IQ accumulation to combine the K repeated bursts.

In another aspect, a technology is provided for one or more transitory or non-transitory machine readable storage mediums having instructions embodied thereon for performing enhanced overlaid code division multiple access (CDMA) to increase uplink (UL) transmission capacity with a mobile device, the instructions when executed by one or more processors and memory can perform identifying a channel quality, a target transmission scheme, and a transmission power level for each of the mobile devices. The instructions when executed by one or more processors and memory can perform assigning each of the mobile devices a unique orthogonal CDMA code. The instructions when executed by one or more processors and memory can perform forcing the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, wherein K is a positive integer that is equal to or greater than a number of the mobile devices that are to have an overlaid CDMA operation performed thereon. The instructions when executed by one or more processors and memory can perform processing the K repeated bursts received from the mobile devices. The instructions when executed by one or more processors and memory can perform separating signals of the mobile devices according to the unique orthogonal CDMA code and use in-phase (I) and quadrature-phase (Q) (IQ) accumulation according to combine the K repeated bursts.

FIG. 1 illustrates an exemplary configuration 100 of a base station 104 that is serving a first mobile device, such as user equipment (UE) 108 and a second mobile device, such as a UE 110. The first UE 108 can be referred to as UE1 and the second UE 110 can be referred to as UE2. The first UE 108 can be located relatively close to the base station 104, whereas the second UE 110 can be located relatively far from the base station 104. In addition, the first UE 108 and the second UE 110 can have different propagation losses due to their distances to the base station 104. For example, the first UE 108 can have a low propagation loss due to being relatively close to the base station 104, and the second UE 110 can have a high propagation loss due to being relatively far from the base station 104. In other words, the second UE 110 can experience higher propagation losses as compared to the first UE 108.

Figure 2:
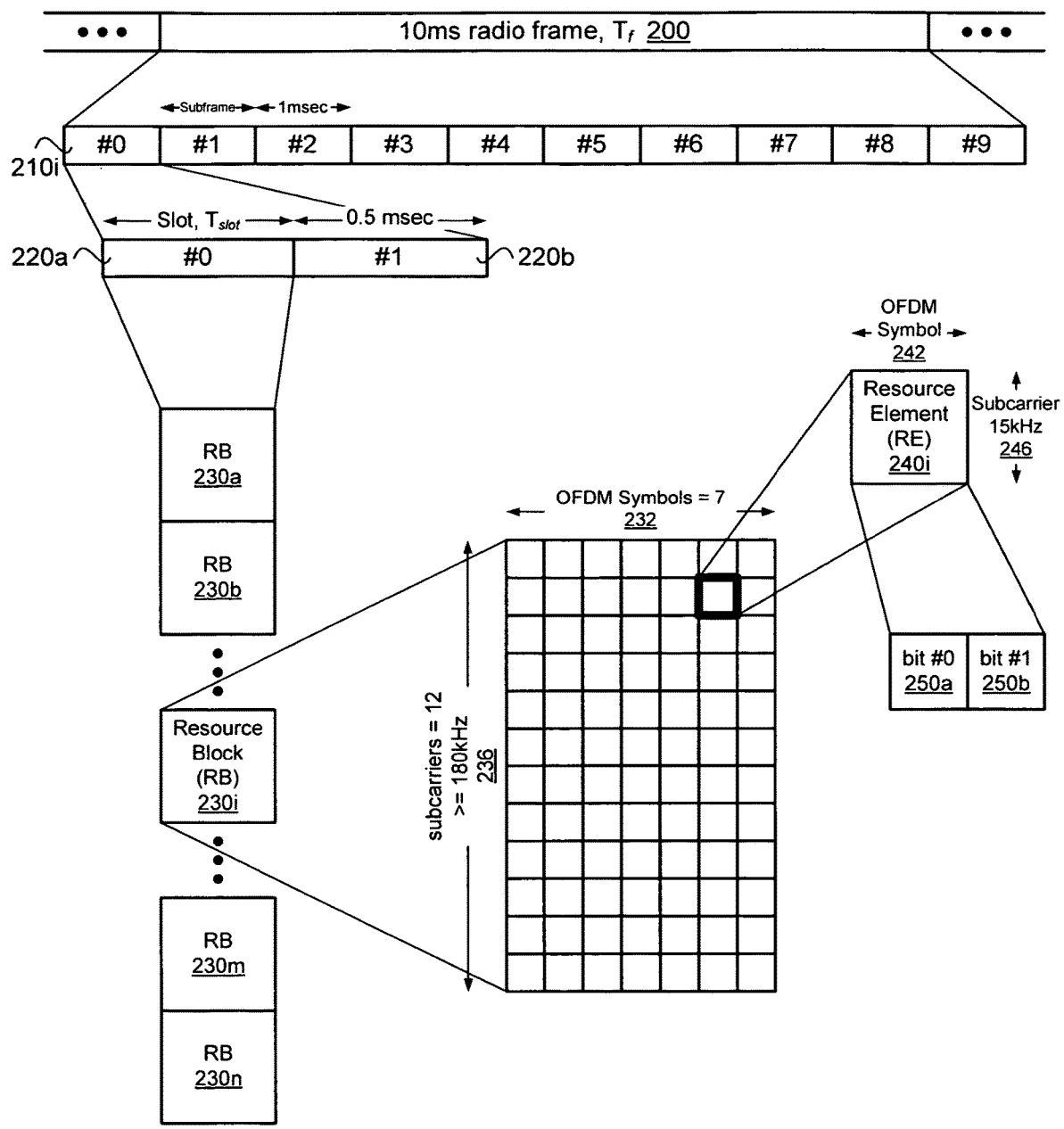
FIG. 2 illustrates an orthogonal frequency division multiple access (OFDMA) frame structure in accordance with an example.

FIG. 2 illustrates a diagram of radio frame resources (e.g., a resource grid) for a downlink (DL) transmission including a legacy physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210$i$ that are each 2 ms long. Each subframe can be further subdivided into two slots 220$a$ and 220$b$, each with a duration, Tslot, of 0.5 ms. The first slot (#0) 220$a$ can include a physical downlink control channel (PDCCH) and/or a physical downlink shared channel (PDSCH), and the second slot (#1) 220$b$ can include data transmitted using the PDSCH. It one aspect, at least part of the architectural design of the radio frame 200 can also be applicable for a single carrier frequency division multiple access (SC-FDMA) in an uplink (UL) transmission.

Each slot for a component carrier (CC) used by the node and the wireless device can include multiple resource blocks (RBs) 230$a$, 230$b$, 230$i$, 230$m$, and 230$n$ based on the CC frequency bandwidth. The CC can have a carrier frequency having a bandwidth and center frequency. Each subframe of the CC can include downlink control information (DCI). The PDCCH in the control region can include one to three columns of the first OFDM symbols in each subframe or physical RB (PRB), when a legacy PDCCH is used. The remaining 11 to 13 OFDM symbols (or 14 OFDM symbols, when PDCCH is not used) in the subframe can be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

In one example embodiment, each RB (physical RB or PRB) 230$i$ can include 12-15 kHz subcarriers 236 (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240*i* using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250*a* and 250*b* of information in the case of quadrature phase-shift keying (QPSK) modulation. Other types of modulation can be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNB to the UE, or the RB can be configured for an uplink transmission from the UE to the eNB.

FIG. 3 illustrates a table 300 of enhanced overlaid CDMA transmission schemes between a base station and a mobile device in accordance with an example. In one aspect, the present technology provides for overlaying CDMA by multiplexing of multiple mobile devices (such as an EC-GSM system) simultaneously on a same physical channel that have favorable channel conditions to implement redundant blind repetitions. In one aspect, as depicted in table 300, any device can utilize one of 8 transmission schemes based on its channel quality for overlaying CDMA by multiplexing of multiple mobile devices.

Table 300 depicts transmission schemes 1-8, MCS levels, such as MCS 1-4, and a number of blind repetitions that can be performed by multiple mobile devices (such as an EC-GSM system) simultaneously on a same physical channel that have favorable channel conditions to implement redundant blind repetitions. Any device can utilize one of 8 transmission schemes based on the devices channel quality. Orthogonality between multiplexed mobile devices can be achieved through the application of orthogonal codes.

That is, for the proposed enhancement for the overlaid CDMA technique, there is no restriction on the MCS scheme utilized by the overlaid devices. In other words, all devices can be overlaid. However, to maintain the orthogonality between the overlaid devices, each device can repeat its transmitted burst and rotate each of these repetitions with a phase shift based on its assigned code such that all the overlaid devices are orthogonal. The number of "R" repetitions can be greater than or equal to the number of "U" overlaid devices, where R and U are both positive integers.

For example, when 4 devices are overlaid, each device can blindly transmit its respective burst R≥4 times, which means there are no blind repetitions (no forced blind repetitions) in transmission schemes 1-4. Thus, since transmission schemes 1-4 do not include any repetitions, the devices implementing these transmission schemes 1-4 can be "forced" to blindly repeat the devices' transmitted bursts in transmission schemes 1-4. The enforced blind repetitions can result in improving the performance of the devices since the enforced blind repetitions can improve the devices received signal strength and subsequently allow the devices to either use a higher MCS level or to reduce the BLER of the devices.

In addition, the performance of the overlaid devices implementing transmission schemes 5-8 can also improve. In particular, rather than searching for device pairs with the same number of blind repetitions, any device experiencing quality and/or favorable channels or channel conditions can be forced to perform a matching number of blind repetitions. Performing a matching number of blind repetitions subsequently increases the power imbalance between the overlaid devices, which can increase the SIC performance and efficiency. For example, a device utilizing transmission scheme 5 can be scheduled 16 slots to blindly repeat the device's blind transmissions (or "burst") and can be overlaid with another device utilizing transmission scheme 8 and can also implement 16 blind repetitions. In this case, the power imbalance can generally be up to 12 dB and the quality of the SIC is significantly increased.

It should be noted that, at the receiver side (e.g., at the mobile device), the blind repetitions of each device can be phase rotated according to an assigned orthogonal sequence received by a base station. Subsequently, the phase shifted repetitions can be added at the symbol level. This can result in IQ combining the desired device's blindly repeated bursts and cancellation of the interference caused by the other overlaid devices. In one aspect, orthogonal sequences can be obtained by using a Hadamard matrix.

Thus, the proposed technology of overlaying a CDMA transmission scheme with mobile devices having favorable channel conditions being forced to implement blind repetitions allow for devices transmitting with MCS 3 and MCS 4 to become more resilient to interference, when compared to devices transmitting using MCS 1 and MCS 2, since devices transmitting with MCS 3 and MCS 4 are experiencing good channel conditions. Thus, by using the overlaid CDMA technique, the devices having favorable channel conditions will be forced to implement blind repetitions thus improving the device's received power and reducing the performance loss due to the interference caused by the overlaid CDMA, i.e., the power leakage from the other overlaid devices. The redundant blind repetitions can also assist in improving the devices' received SINR and thus enable the devices to utilize a higher MCS level than the one the devices would have used without the blind repetitions. Subsequently, this increases both, the system throughput as well as the devices' throughput. Alternatively, in one aspect, the base station can decide to trade the improved SINR for improving the link reliability rather than increasing the system throughput. For example, when a device with a good channel quality, such as a device using MCS 3, is forced to implement blind repetitions, the device's received signal at the base station can have a higher SINR. In this case, if the device does not use a higher MCS level, the device can achieve a lower block error rate due to an improved SINR level of the device.

In one aspect, the multiple forced blind repetitions can enable the devices to exploit time diversity, which can improves the reliability of data transmission of the devices. In one aspect, the transmit power per repetition can be reduced and does not necessitates the devices with forced blind repetitions to increase the transmit power.

In one aspect, the multiple forced blind repetitions can eliminate a stringent constraint on finding matching device pairs that are implementing the same number of blind repetitions.

In one aspect, the overlaid CDMA technique enables the base station to increase the throughput of one or more devices while simultaneously reducing the devices block error rate. The forced blind repetitions increase the SINR to increase the devices' throughput. For example, consider a scenario in which there exist two devices implementing transmission schemes 2 and 5, respectively. In a legacy system, the first device is assigned a single time slot whereas the other device is assigned two time slots. For simplicity, consider that each of the two devices transmit at 5 dB. In the legacy system, the first device would transmit without repetitions, whereas the second device would implement 2 blind repetitions each with 5 dB. In this case 3 radio resources will be used by the two devices to transmit their data.

As such, by applying proposed technology, the first device can be forced to implement 2 blind repetitions each with 3 dB and then multiplexed with the second device using a Hadamard code of length 2. It is assumed that the codes are perfectly orthogonal and that the blind repetitions are perfectly combined. This results in a 3 dB gain in the SINR of the first device and thus it can either utilize a higher MCS level to increase the throughput of the first device, or reduce the BLER of the first device at the same MCS level. In addition, one radio resource can be released due to the multiplexing technique. The radio resource can also be used for other devices with inferior channel quality. It should be noted that for devices transmitting with MCS 4, which are already operating at the maximum possible rate/throughput, the enhanced overlaid CDMA technique can be used to improve the BLER performance. Moreover, devices transmitting with transmission Scheme 8 (e.g., the devices already using the maximum number of blind repetitions) can still obtain a gain, i.e., a reduction in the incurred interference, from the power imbalance. This is because, the power imbalance will improve the accuracy of the SIC since the devices with bad channel qualities (e.g., lower channel qualities compared to higher channel qualities) are overlaid with other devices observing a higher channel quality. In this case, the devices with higher channel qualities can be detected first and the device's interfering power on the other devices can be removed using SIC.

Thus, in one aspect, overlaid CDMA technique can include 1) obtaining a channel quality of all the devices in a scheduling interval, 2) identifying potential coverage extended devices and/or devices with favorable channel conditions which can be overlaid, 3) identifying the channel quality, target transmission scheme, and transmit power level of each device, 4) assigning each device a unique orthogonal CDMA code, 5) signaling the control information associated with the overlaid CDMA technique (e.g., enabling overlaid CDMA, transmission scheme, transmit power level, orthogonal code index, etc.) to the devices, and 6) at the base station, separate the devices based on their assigned codes and IQ combine their received signals.

Figure 4:
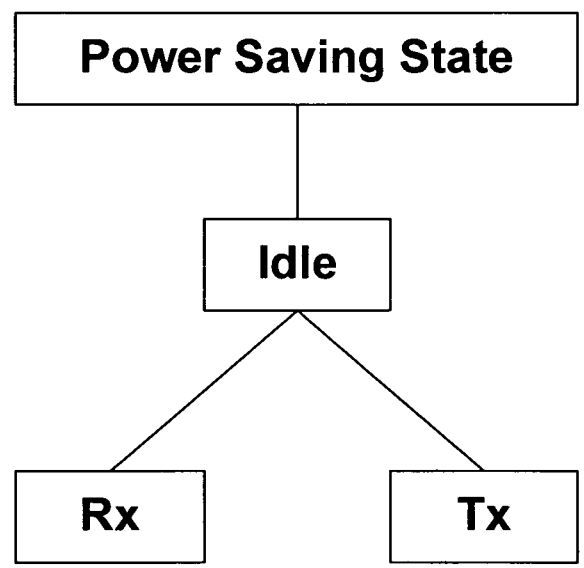
FIG. 4 illustrates a four states relating to enhanced overlaid CDMA transmission schemes for a mobile device in accordance with an example.

FIG. 4 illustrates four possible states 400 relating to enhanced overlaid CDMA transmission schemes for a mobile device in accordance with an example. As depicted in FIG. 4, there may be 4 states for a CIoT device from a power perspective of 1) a power saving state, 2) an idle state, 3) a transmission (Tx) state, and 4) a reception (Rx) state. In one aspect, by way of example only, each CIoT device can transmit (Tx) each repeated burst with full power, represented as "P", where P is a positive integer. However, the limited power available to some CIoT devices can impose a relatively stringent constraint on the transmission (Tx) power. Such devices can still be overlaid using the proposed overlaid CDMA technique, but with a reduced power per repeated burst. For example, rather than having 1 burst transmission with power P, a device with limited power can repeat the transmitted burst 4 times each with power P/4. In this case, the only loss would come from the power consumed by the electronic circuitry of the device.

Figure 5:
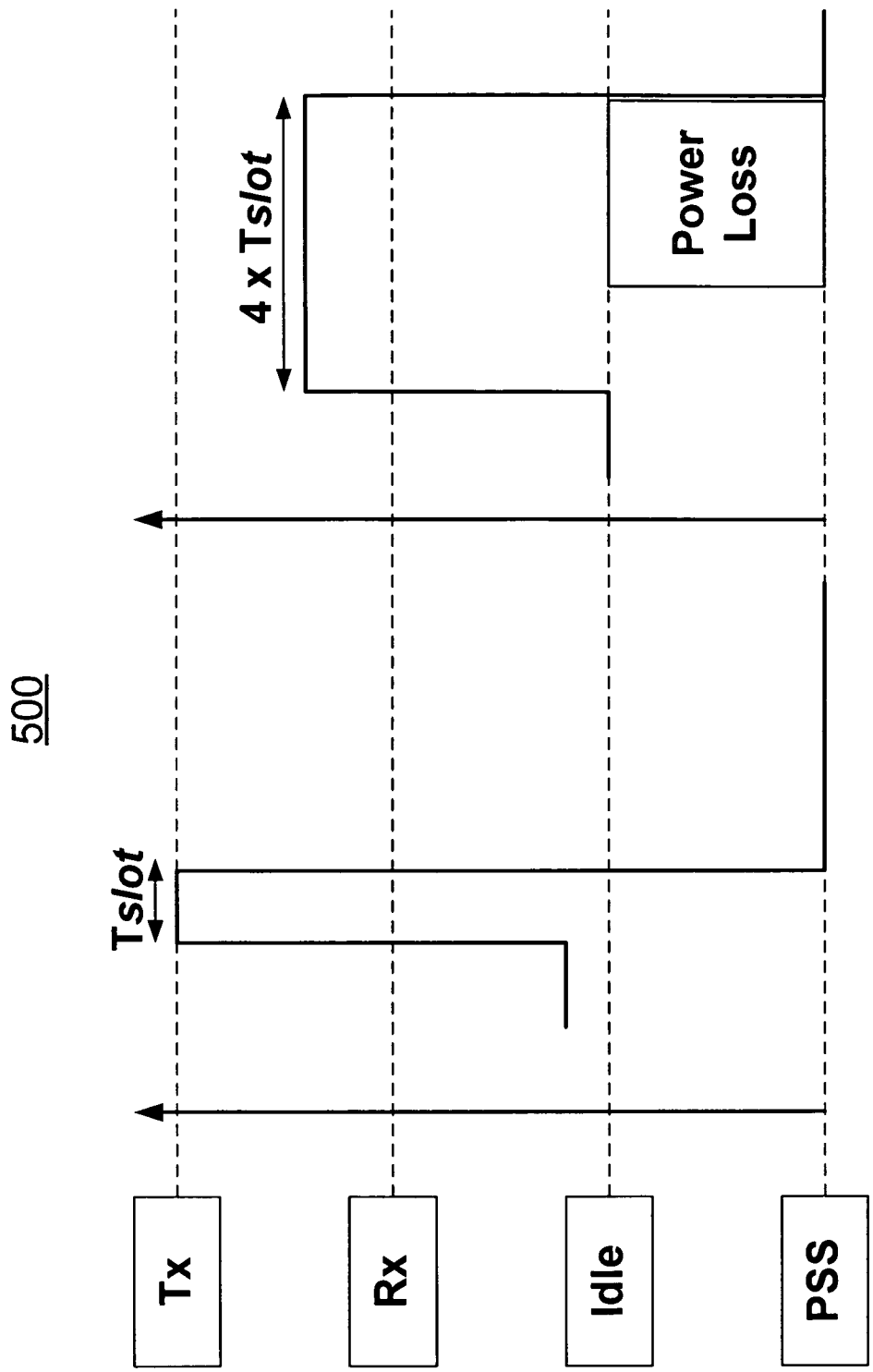
FIG. 5 illustrates an enhanced overlaid CDMA transmission scheme with a mobile device being forced to implement blind repetitions in accordance with an example.

Turning now to FIG. 5, an enhanced overlaid CDMA transmission scheme with a mobile device being forced to implement blind repetitions is depicted, 500. FIG. 5 depicts 500 a device implementing transmission scheme 1 and is forced to do 4 blind repetitions (e.g., bursts). In one aspect, when a device has favorable channel condition and is not overlaid, the device can transmit data and then switch to the power saving state (PSS). That is, the device in FIG. 5 can transmit (Tx) data during time period ($T_{slot}$). However, if the device is CDMA overlaid, the device can be constrained to transmit for a longer time period as compared to the not being overlaid, such as due to being forced to performed K blind repetitions, where K is a positive integer. That is, the device can be forced to perform 4 blind repetitions and thus transmits (Tx) during a time period $4 \times T_{slot}$. Despite the fact that the device's total transmit power can be maintained constant, the electronic circuitry of the device can be kept active, thus resulting in an additional power consumption, as depicted in FIG. 5. However, the power loss of the device can be considered tolerable since the power drained in the idle state mode (idle) can be significantly less than that in the transmission state mode.

In one aspect, CIoT devices attempting UL transmission may not be perfectly synchronized in both frequency and time, meaning that there can exist transmitter frequency offsets and timing offsets between the overlaid devices. Each overlaid device can experience a residual interference power due to the power leakage from the other overlaid devices despite using the orthogonal codes. The drawback of residual interference power due to the power leakage becomes even more prominent as the frequency offset increases. To mitigate this drawback, a SIC scheme can be deployed, whereby the received signals of the overlaid devices can be sequentially processed starting with the devices which has the highest signal strength or SINR. After processing each signal and detecting the transmitted bits of the signal, the decoded bits can be used to generate an estimate of the received signal, which is then subtracted to remove the induced interference on the received signals of the remaining overlaid devices. It should be noted that one advantage of the proposed technology allows users with different MCS levels to be simultaneously overlaid. The high power imbalance can improve the quality of the SIC and thus reduces the mutual interference between the overlaid devices.

In one aspect, for the orthogonal coding scheme can be use to maintain the orthogonality between the overlaid devices in order to minimize mutual interference between each of the overlaid CDMA devices. In one aspect, the orthogonality between the overlaid devices can be maintained by assigning each device an orthogonal sequence, such as a Walsh-Hadamard sequences or a Discrete Fourier Transform (DFT) sequence.

Figure 7:
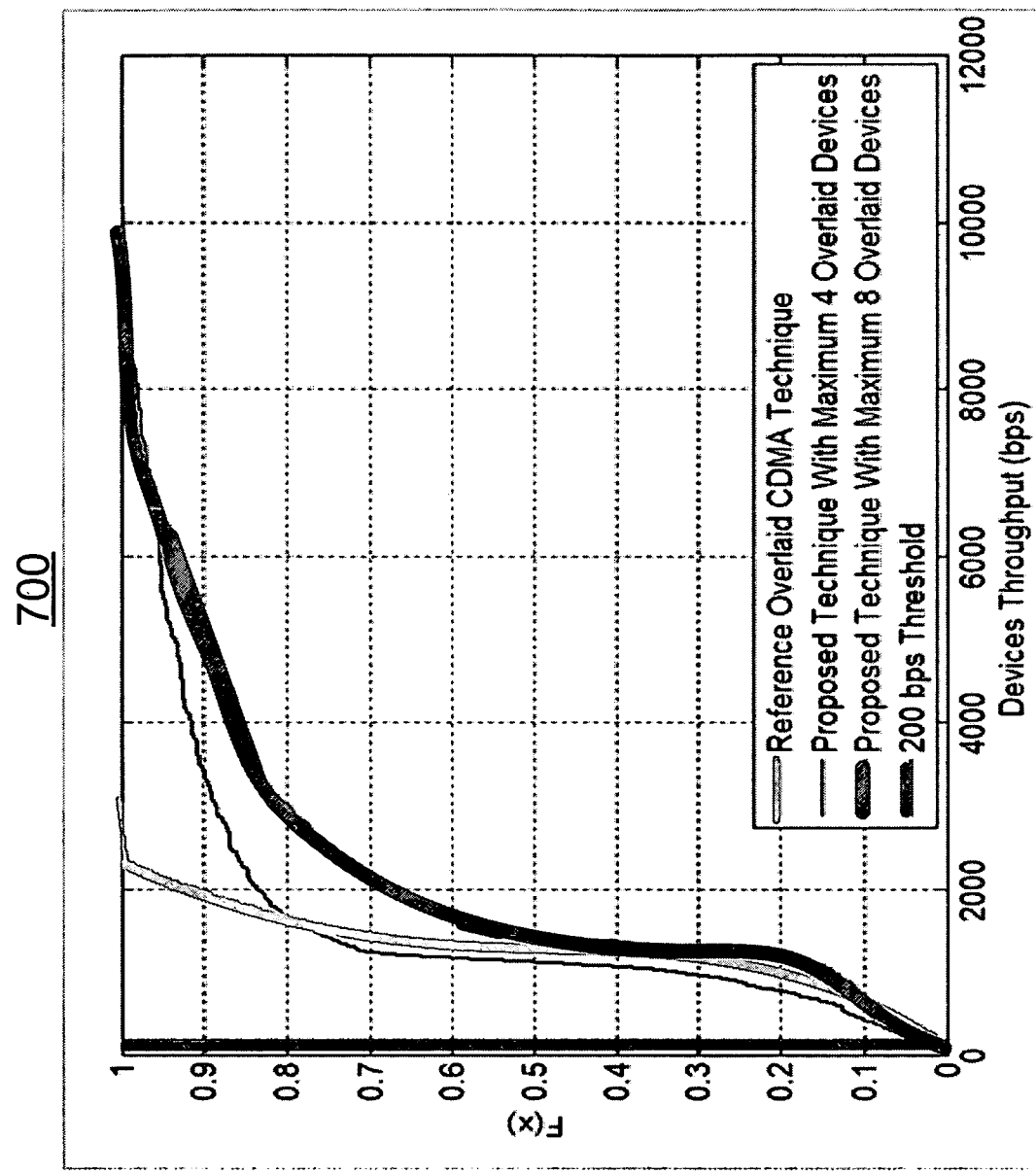
FIG. 7 illustrates a performance graph of multiple mobile device implementing an enhanced overlaid CDMA transmission schemes with a base station in accordance with an example.

FIG. 6 illustrates one example of a table 600 of simulation parameters for enhanced overlaid CDMA transmission schemes between a base station and a mobile device. FIG. 7 illustrates a performance graph 700 of multiple mobile devices implementing an enhanced overlaid CDMA transmission scheme with a base station in accordance with an example. In other words, using the parameters of FIG. 6, simulation results displayed in FIG. 7 depict the performance gain of the proposed overlaid CDMA technique. The performance graph 700 illustrates the cumulative distribution function (CDF) (e.g., F(x)) of the devices throughput in bits per second (bps). For example, in FIG. 7, 40 devices each with a full buffer are used to evaluate the performance of the proposed technique under two scenarios. In the first scenario, the maximum number of overlaid devices is set to 4. In the second scenario, the maximum number of overlaid devices is set to be 8. In both scenarios, it is assumed that devices utilizing transmission schemes 2, 3, and 4 can be forced to implement 8 blind repetitions. It should be noted that the devices can have a 9 dB performance gain, and thus can transmit using MCS 4. In addition, by assuming a perfect IQ combining, a 3 dB power gain is achieved by combining two repetitions.

As illustrated in FIG. 7, the overlaid CDMA technique can have a positive impact on the devices' throughputs. In addition, it should be noted that increasing the maximum number of overlaid devices significantly increases the gain in terms of the system throughput. This is because, the increase in the number of devices in the system helps in enriching the user diversity. In other words, increasing the number of devices in the system can directly increase the possibility of the implementation of the overlaid CDMA technique and thus improves the over all system throughput. By way of example only, the numbers depicted in FIG. 7 illustrate the system throughput and the gains of FIG. 7 illustrate dependency on system parameters.

As described herein, in one embodiment, the present technology provides that a base station can force one or more of the mobile devices and extended coverage devices, both of which have favorable channel quality to do blind repetitions, which can be 2, 4, 8 or 16 times, with the same transmit power level. The blindly repeated bursts of each device can be buffered and IQ combined at the base station. In one aspect, the base station can select a higher uplink MCS level for the devices that are forced to do blind repetitions to improve their throughput. In one aspect, the base station can keep the same uplink MCS level and use the accumulated power to increase the link reliability. The base station can free up radio resources by overlaying the extended coverage devices and the devices that were forced to do the blind repetitions.

In another aspect, the base station can force some of the devices with favorable channel quality to do K blind repetitions with the reduced transmit power levels in addition to the coverage extended devices, where K is a positive integer. The base station can free up radio resources by overlaying the extended coverage devices and the devices that were forced to do the blind repetitions. The base station can also force the coverage extended devices to do a larger number of blind repetitions than the number of blind repetitions used for the successful detection of the lowest uplink MCS level.

In one aspect, the base station can select a higher uplink MCS level for the devices that are forced to do extra blind repetitions to improve the throughput of the device. In one aspect, the base station can maintain the same uplink MCS level to increase the link reliability. The base station can multiplex the devices despite the various channel qualities for overlaying CDMA. For example, a base station can select to multiplex a selected number of coverage extended devices and a selected number of devices, which are forced to do K blind repetitions to match the number of blind repetitions of the coverage extended devices. That is, the mobile devices having good channel quality conditions (e.g., good, high, or favorable representing channel qualities at or above a predefined standard and/or normal operating level or steady state condition) are forced to transmit K blind repetitions to enable the base station to overlay these devices with the ones with low channel quality. conditions (e.g., low, bad, or unfavorable representing channel qualities below a predefined standard and/or below a normal operating level or steady state condition)

The variations in the channel qualities can help a successive interference cancellation receiver to function properly. Also, the base station can signal messages for enabling overlaid CDMA, transmission scheme selection (MCS selection, number of repetitions), transmit power level, orthogonal code indices to the devices that are forced to do blind repetitions via the DL control channels or higher layer signaling.

Figure 8:
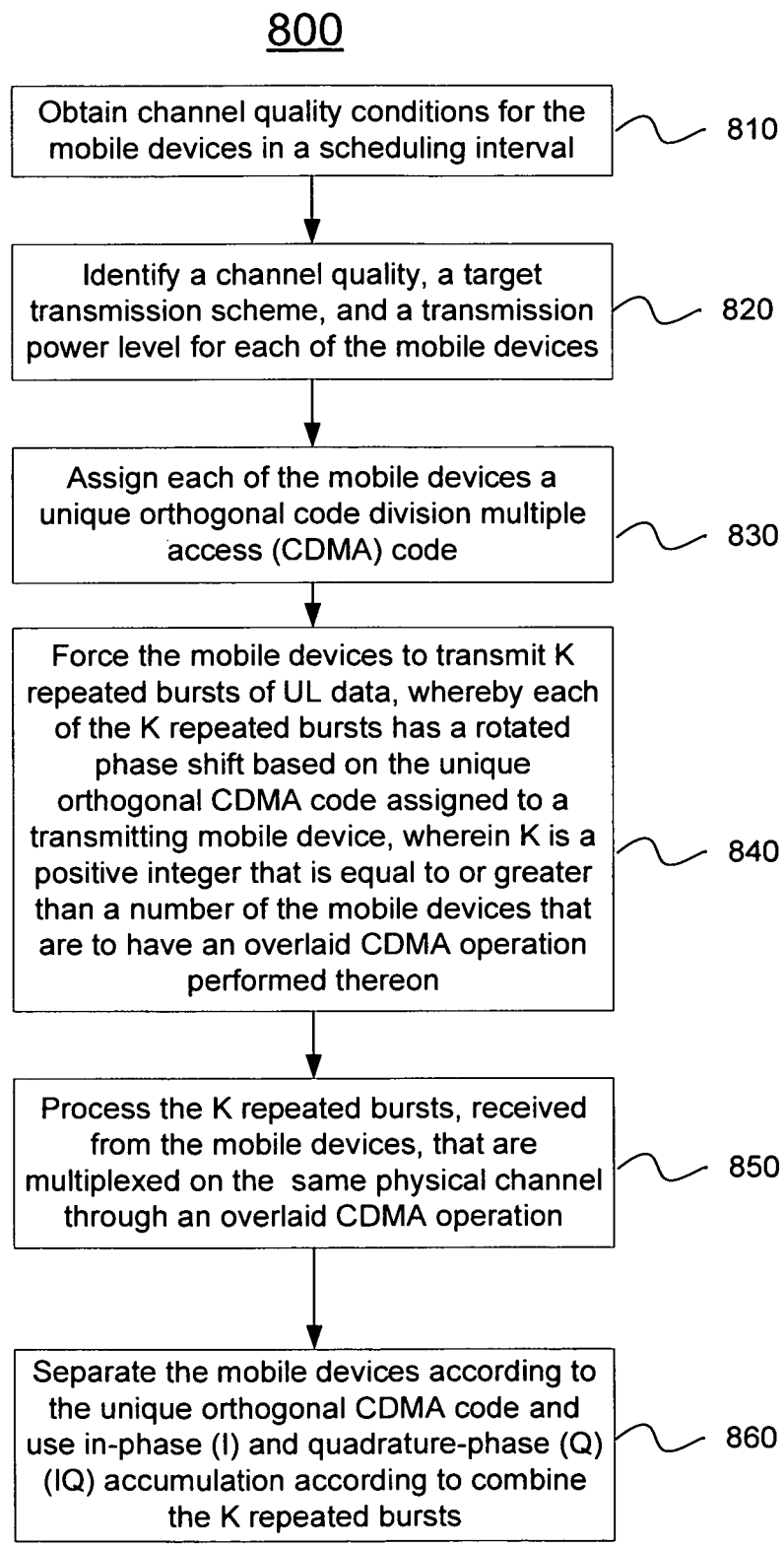
FIG. 8 depicts functionality of a base station operable to perform enhanced overlaid code division multiple access (CDMA) to increase uplink (UL) transmission capacity with a mobile device in accordance with an example.

Another example provides functionality 800 of a base station operable to perform enhanced overlaid code division multiple access (CDMA) to increase uplink (UL) transmission capacity with a mobile device, as shown in the flow chart in FIG. 8. The functionality can be implemented as a method or the functionality can be executed as instructions on a machine, where the instructions are included one or more computer readable mediums or one or more non-transitory machine readable storage medium. The base station can comprise one or more processors and memory configured to: Obtain channel quality conditions for mobile devices in a scheduling interval, as in block 810. The base station can comprise one or more processors and memory configured to: identify a channel quality, a target transmission scheme, and a transmission power level for each of the mobile devices, as in block 820. The base station can comprise one or more processors and memory configured to: assign each of the mobile devices a unique orthogonal CDMA code, as in block 830. The base station can comprise one or more processors and memory configured to: force the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, as in block 840. The value K is a positive integer that is equal to or greater than the number of the mobile devices that have the overlaid CDMA. The base station can comprise one or more processors and memory configured to: receive, from the mobile devices, the K repeated bursts that are each multiplexed a same physical channel for overlaying the CDMA, as in block 850. The base station can comprise one or more processors and memory configured to: separate the mobile devices according to the unique orthogonal CDMA code and use in-phase (I) and quadrature-phase (Q) (IQ) accumulation according to combine the K repeated bursts, as in block 860.

Also, in one or more of the steps of FIG. 8, the base station can comprise one or more processors and memory configured to identify the mobile devices having more efficient channel quality conditions as compared to the mobile devices having less efficient channel quality conditions and that are capable of the overlaid CDMA, wherein the mobile devices forced to transmit K repeated bursts have the more efficient channel quality conditions as compared to those having less efficient channel quality conditions. The base station can comprise one or more processors and memory configured to force the mobile devices have the more efficient channel quality conditions as compared to the mobile devices having less efficient channel quality conditions and extended coverage devices to transmit K repeated bursts. The base station can comprise one or more processors and memory configured to perform a matching of the to K repeated bursts transmitted by the forced mobile devices have the more efficient channel quality conditions as compared to the mobile devices having less efficient channel quality conditions and extended coverage devices to transmit K repeated bursts. The base station can comprise one or more processors and memory configured to force only a portion of the mobile devices have the more efficient channel quality conditions as compared to the mobile devices having less efficient channel quality conditions and extended coverage devices to transmit K repeated bursts. The base station can comprise one or more processors and memory configured to force only a portion of the mobile devices that the more efficient channel quality conditions as compared to the mobile devices having less efficient channel quality conditions and extended coverage devices to transmit K repeated bursts. The base station can comprise one or more processors and memory configured to buffer each of the K repeated bursts. The base station can comprise one or more processors and memory configured to multiplex extended radio coverage mobile devices and the mobile devices forced to transmit the K repeated bursts simultaneously on a same set of radio resources using unique orthogonal CDMA codes. The base station can comprise one or more processors and memory configured to select a higher uplink Modulation and Coding Scheme (MCS) level for the mobile devices forced to transmit the K repeated bursts. The base station can comprise one or more processors and memory configured to select a same uplink Modulation and Coding Scheme (MCS) level for the mobile devices forced to transmit the K repeated bursts and using an accumulation of transmission power to increase the UL transmission reliability. The base station can comprise one or more processors and memory configured to process the K repeated bursts, received from the mobile devices, using a maximum transmission power by the mobile station, and/or process the K repeated burst, received from the mobile devices, using a reduced transmission power. The base station can comprise one or more processors and memory configured to use a successive interference cancelation (SIC) scheme to sequentially process the received K repeated bursts according to signal strength of the K repeated bursts. The K repeated bursts can be one of 2, 4, 8, or 16 for the K repeated bursts. In one aspect, the K repeated bursts can be one of 2, 4, 8, 16, or a positive integer greater than one according to system parameters, system design, and/or system configuration for the K repeated bursts.

Figure 9:
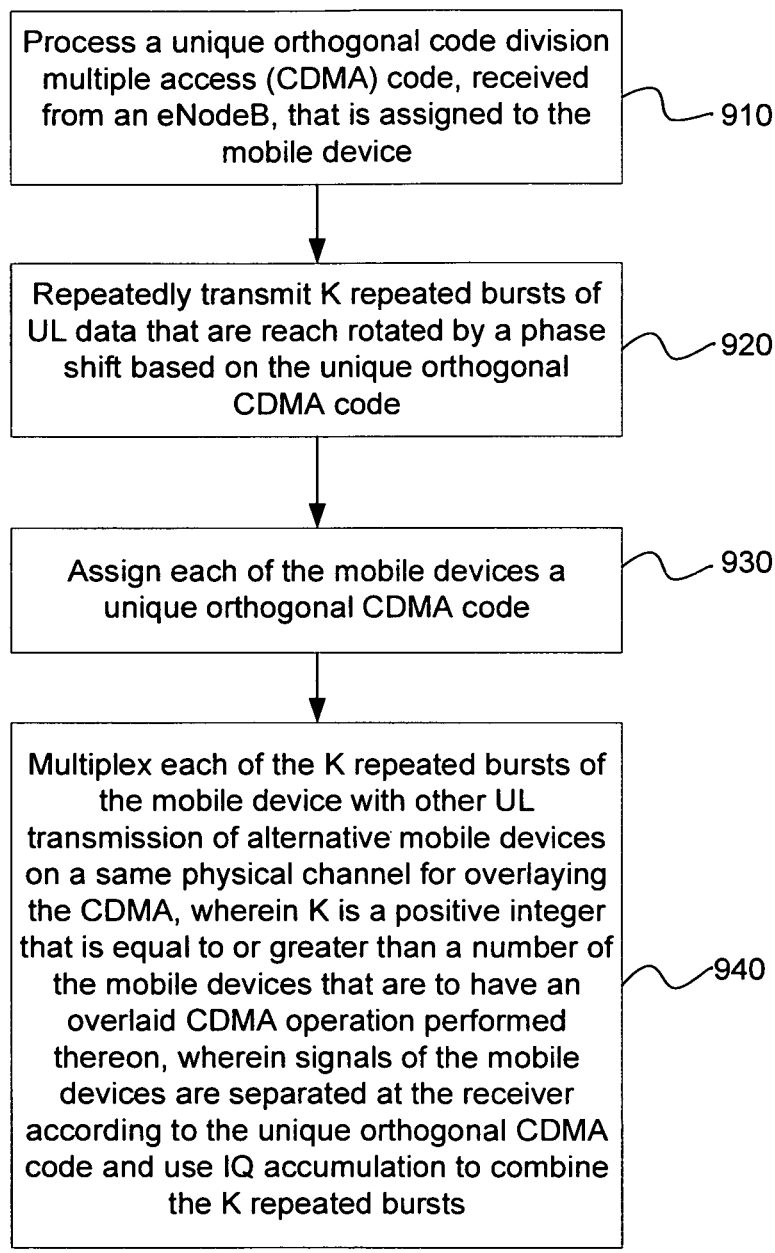
FIG. 9 depicts functionality of an mobile station operable to perform enhanced overlaid code division multiple access (CDMA) to increase uplink (UL) transmission capacity with a base station in accordance with an example.

Another example provides functionality 900 of a mobile device, such as a user equipment (UE), operable to perform enhanced overlaid code division multiple access (CDMA) to increase uplink (UL) transmission capacity with a base station, as shown in the flow chart in FIG. 9. The functionality can be implemented as a method or the functionality can be executed as instructions on a machine, where the instructions are included one or more computer readable mediums or one or more non-transitory machine readable storage mediums. The mobile device can comprise one or more processors and memory configured to: process a unique orthogonal CDMA code, received from an eNodeB that is assigned to the mobile device, as in block 910. The mobile device can comprise one or more processors and memory configured to: repeatedly transmit K repeated bursts of UL data that are reach rotated by a phase shift based on the unique orthogonal CDMA code, as in block 920. The mobile device can comprise one or more processors and memory configured to: assign each of the mobile device a unique orthogonal CDMA code, as in block 930. The mobile device can comprise one or more processors and memory configured to: multiplex each of the K repeated bursts of the mobile device with other UL transmission of alternative mobile devices on a same physical channel for overlaying the CDMA, wherein the value of K can a positive integer that can be equal to or greater than the number of the mobile devices that have the overlaid CDMA, wherein signals of the mobile devices can be separated at the receiver according to the unique orthogonal CDMA code and use IQ accumulation to combine the K repeated bursts, as in block 940.

Also, in one or more of the steps of FIG. 9, the mobile device can comprise one or more processors and memory configured to repeatedly transmit K repeated bursts of UL data have more efficient channel quality conditions as compared to other mobile devices that have less efficient channel quality conditions and that are capable of the overlaid CDMA, wherein the mobile devices are forced, by the eNodeB, to transmit K repeated bursts. Also, both the mobile device that repeatedly transmit K repeated bursts of UL data that have more efficient channel quality conditions as compared to other mobile devices that have less efficient channel quality conditions and that are capable of the overlaid CDMA and extended coverage devices can transmit K repeated bursts of UL data that are reach rotated by a phase shift based on the unique orthogonal CDMA code. The mobile device can comprise one or more processors and memory configured to buffer each of the K repeated bursts. The mobile device can comprise one or more processors and memory configured to multiplex extended radio coverage mobile devices and the mobile devices forced to transmit the K repeated bursts simultaneously on a same set of radio resources using unique orthogonal CDMA codes. The mobile device can comprise one or more processors and memory configured to process, for transmitting, the K repeated bursts in a higher uplink Modulation and Coding Scheme (MCS) level. The mobile device can comprise one or more processors and memory configured to process, for transmission, the K repeated bursts using a same uplink Modulation and Coding Scheme (MCS) level, process, for transmitting, the K repeated bursts using a maximum transmission power, and/or process, for transmitting, the K repeated bursts using a reduced transmission power, where K can be one of 2, 4, 8, or 16 for the K repeated bursts. The mobile device can comprise one or more processors and memory configured to feedback to the eNodeB channel quality conditions, a target transmission scheme, and a transmission power level.

Figure 10:
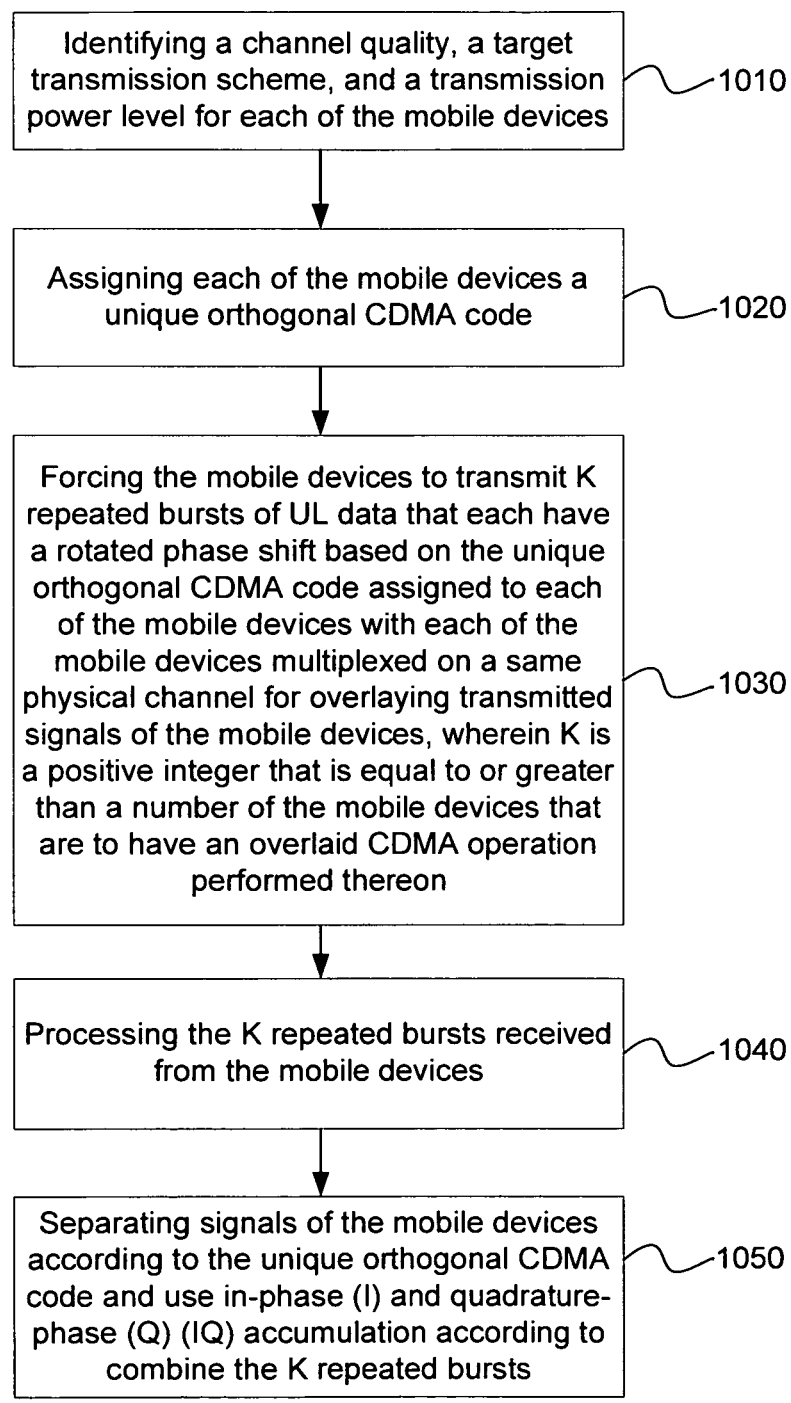
FIG. 10 depicts a flowchart of a transitory or non-transitory machine readable storage medium having instructions embodied thereon for performing enhanced overlaid code division multiple access (CDMA) to increase uplink (UL) transmission capacity between a base station and a mobile device in accordance with an example.

Another example provides one or more transitory or non-transitory machine readable storage mediums having instructions 1000 embodied thereon for performing enhanced overlaid code division multiple access (CDMA) to increase uplink (UL) transmission capacity between a base station and a mobile device, as shown in the flow chart in FIG. 10. The method can be executed as instructions on a machine, where the instructions are included on one or more computer readable mediums or one or more non-transitory machine readable storage mediums, which can include and or be associated with one or more processors and memory. The instructions when executed (e.g., by a one or more processors and memory) perform: identifying a channel quality, a target transmission scheme, and a transmission power level for each of the mobile devices, as in block 1010. The instructions when executed perform: assigning each of the mobile devices a unique orthogonal CDMA code, as in block 1020. The instructions when executed perform: forcing the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, wherein K is a positive integer that is equal to or greater than a number of the mobile devices that are to have an overlaid CDMA operation performed thereon, as in block 1030. The instructions when executed by the one or more processors and memory perform: processing the K repeated bursts received from the mobile devices, as in block 1040. The instructions when executed perform: separating signals of the mobile devices according to the unique orthogonal CDMA code and use in-phase (I) and quadrature-phase (Q) (IQ) accumulation according to combine the K repeated bursts, as in block 1050.

Also, in one or more of the steps of FIG. 10, the instructions when executed by the one or more processors and memory perform: obtaining channel quality conditions for the mobile devices in a scheduling interval; and/or identify the mobile devices having more efficient channel quality conditions as compared to the mobile devices having less efficient channel quality conditions and that are capable of the overlaid CDMA, wherein the mobile devices forced to transmit K repeated bursts have the more efficient channel quality conditions as compared to those having less efficient channel quality conditions. The instructions which when executed by the one or more processors and memory performs the following: force the mobile devices having the more efficient channel quality conditions as compared to the mobile devices having less efficient channel quality conditions and extended coverage devices to transmit K repeated bursts, wherein K is one of 2, 4, 8, or 16 or a positive integer greater than 1 for the K repeated bursts (which can be a based on a system design or specification).

Figure 11:
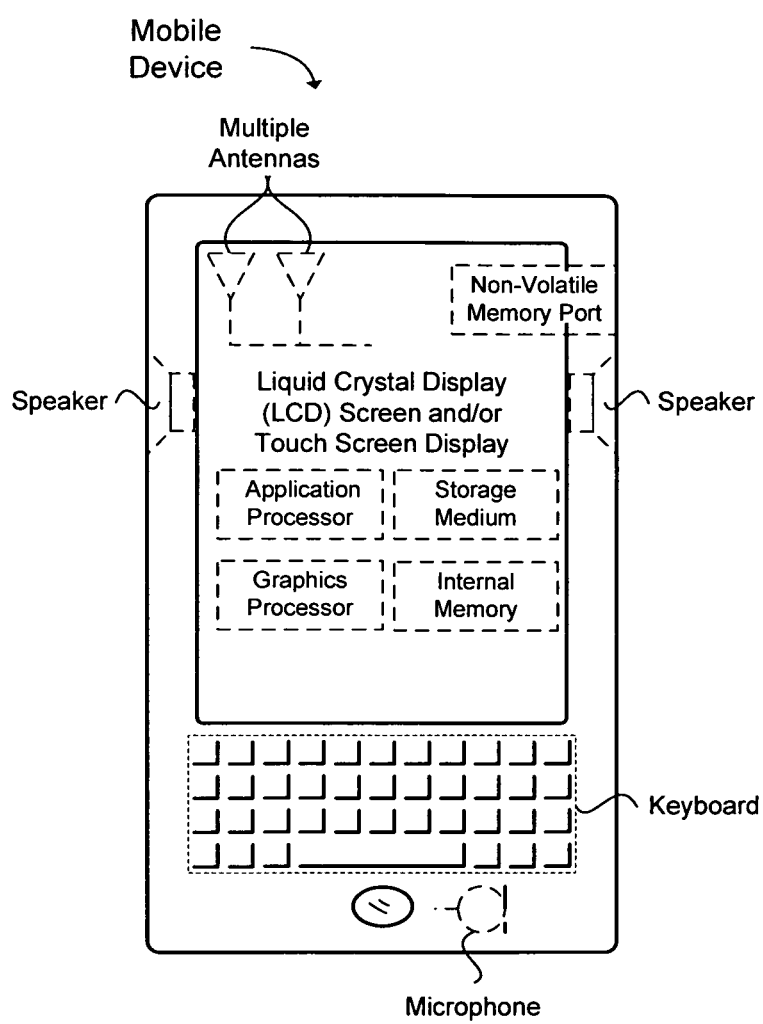
FIG. 11 illustrates a diagram of a wireless device (e.g., UE) in accordance with an example.

FIG. 11 provides an example illustration of the wireless device 1100, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, an application processor, internal memory, a non-volatile memory port, and combinations thereof. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not have to be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, the term "circuitry" can refer to, be part of, or include a Application Specific Integrated Circuit (ASIC), an electronic circuit, a processor (shared, dedicated, or group), and/or memory)shared, dedicated, or group (that execute one or more amssoftware or firmware progr, acombinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Aspects described herein can be implemented into a system using any suitably configured hardware and/or software.

Figure 12:
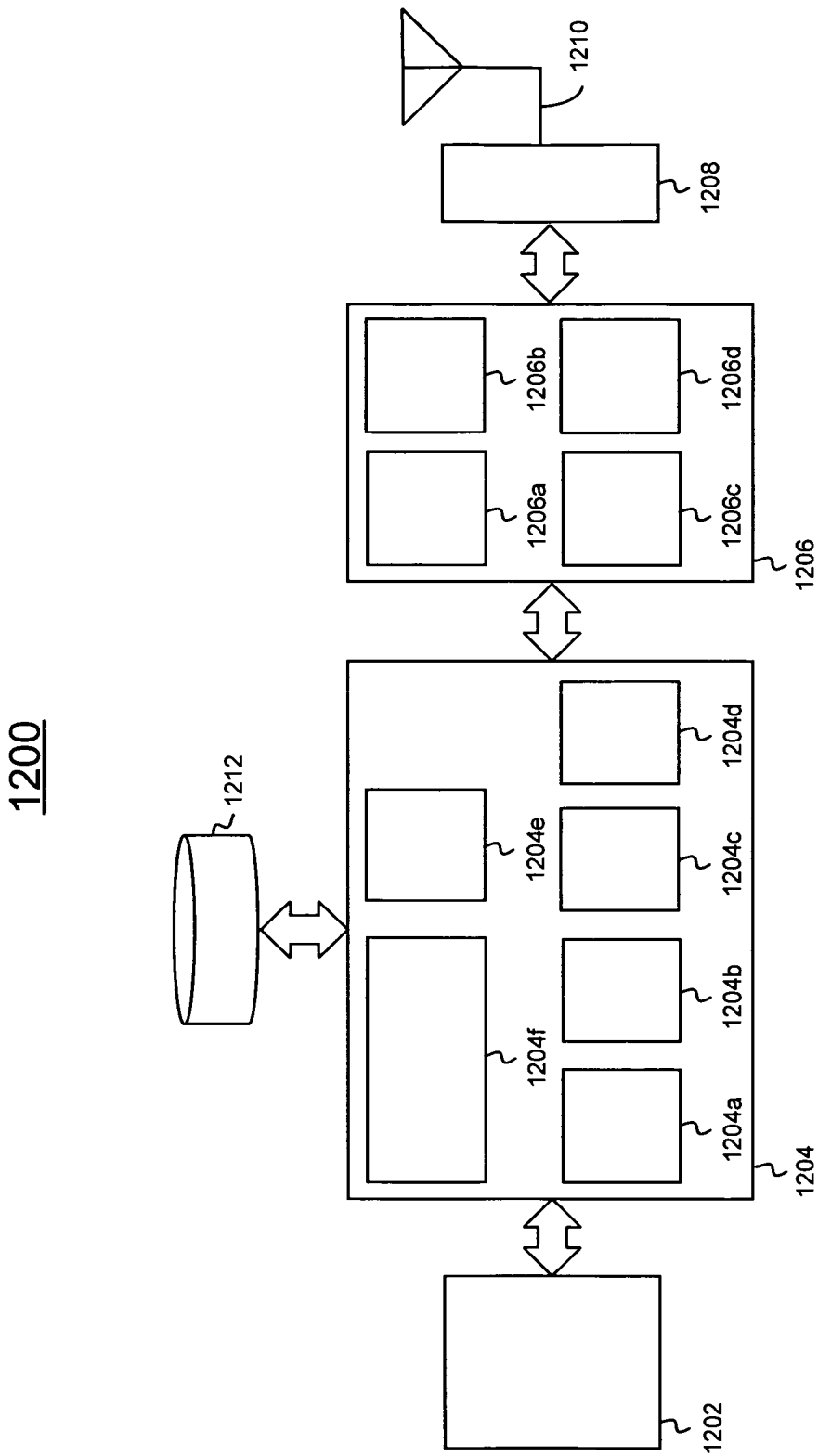
FIG. 12 illustrates a diagram of example components of a wireless device (e.g. User Equipment "UE") device in accordance with an example.

FIG. 12 illustrates, for one aspect, example components of a User Equipment (UE) device 1200. In some aspects, the UE device 1200 can include application circuitry 1202, baseband circuitry 1204, Radio Frequency (RF) circuitry 1206, front-end module (FEM) circuitry 1208 and one or more antennas 1210, coupled together at least as shown.

The application circuitry 1202 can include one or more application processors. For example, the application circuitry 1002 can include circuitry such as, but not limited to, one more single or-core or multi-core processors. The processor(s) can include any combination of general-purpose processors and dedicated processors (e.g., graphics processors, application processors, etc.). The processors can be coupled with and/or can include a storage medium 1212, and can be configured to execute instructions stored in the storage medium 1212 to enable various applications and/or operating systems to run on the system.

The baseband circuitry 1204 can include circuitry such as, but not limited to, one or more single-core or multi-core processors. The baseband circuitry 1204 can include one or more baseband processors and/or control logic to process baseband signals received from a receive signal path of the RF circuitry 1206 and to generate baseband signals for a transmit signal path of the RF circuitry 1206. Baseband processing circuitry 1204 can interface with the application circuitry 1202 for generation and processing of the baseband signals and for controlling operations of the RF circuitry 1206. For example, in some aspects, the baseband circuitry 1204 can include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) can handle various radio control functions that enable communication with one or more radio networks via the RF circuitry 1206. The radio control functions can include, but are not limited to, signal modulation/demodulation, encoding/decoding, radio frequency shifting, etc. In some aspects, modulation/demodulation circuitry of the baseband circuitry 1204 can include Fast-Fourier Transform (FFT), precoding, and/or constellation mapping/demapping functionality. In some aspects, encoding/decoding circuitry of the baseband circuitry 1204 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1204 can include elements of a protocol stack such as, for example, elements of an evolved universal terrestrial radio access network (EUTRAN) protocol including, for example, physical (PHY), media access control (MAC) radio link control (RLC), packet data convergence protocol (PDCP), and/or radio resource control (RRC) elements. A central processing unit (CPU) 1204e of the baseband circuitry 1204 can be configured to run elements of the protocol stack for signaling of the PHY, MAC, RLC, PDCP and/or RRC layers. In some aspects, the baseband circuitry can include one or more audio digital signal processor(s) (DSP) 1204f. The audio DSP(s) 1204f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1204 and the application circuitry 1202 can be implemented together such as, for example, on a system on a chip (SOC).

In some aspects, the baseband circuitry 1204 can provide for communication compatible with one or more radio technologies. For example, in some aspects, the baseband circuitry 1204 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various aspects, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some aspects, the RF circuitry 1206 can include a receive signal path and a transmit signal path. The receive signal path of the RF circuitry 1206 can include mixer circuitry 1206a, amplifier circuitry 1206b and filter circuitry 1206c. The transmit signal path of the RF circuitry 1206 can include filter circuitry 1206c and mixer circuitry 1206a. RF circuitry 1206 can also include synthesizer circuitry 1206d for synthesizing a frequency for use by the mixer circuitry 1206a of the receive signal path and the transmit signal path. In some aspects, the mixer circuitry 1206a of the receive signal path can be configured to down-convert RF signals received from the FEM circuitry 1208 based on the synthesized frequency provided by synthesizer circuitry 1206d. The amplifier circuitry 1206b can be configured to amplify the down-converted signals and the filter circuitry 1206c can be a low-pass filter (LPF) or band-pass filter (BPF) configured to remove unwanted signals from the down-converted signals to generate output baseband signals. Output baseband signals can be provided to the baseband circuitry 1204 for further processing. In some aspects, the output baseband signals can be zero-frequency baseband signals, although this is not a constraint. In some aspects, mixer circuitry 1206a of the receive signal path can comprise passive mixers, although the scope of the aspects is not limited in this respect.

In some aspects, the mixer circuitry 1206a of the transmit signal path can be configured to up-convert input baseband signals based on the synthesized frequency provided by the synthesizer circuitry 1206d to generate RF output signals for the FEM circuitry 1208. The baseband signals can be provided by the baseband circuitry 1204 and can be filtered by filter circuitry 1206c. The filter circuitry 1206c can include a low-pass filter (LPF), although the scope of the aspects is not limited in this respect.

In some aspects, the mixer circuitry 1206a of the receive signal path and the mixer circuitry 1206a of the transmit signal path can include two or more mixers and can be arranged for quadrature downconversion and/or upconversion respectively. In some aspects, the mixer circuitry 1206a of the receive signal path and the mixer circuitry 1206a of the transmit signal path can include two or more mixers and can be arranged for image rejection (e.g., Hartley image rejection). In some aspects, the mixer circuitry 1206a of the receive signal path and the mixer circuitry 1206a can be arranged for direct downconversion and/or direct upconversion, respectively. In some aspects, the mixer circuitry 1206a of the receive signal path and the mixer circuitry 1206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode embodiments, a separate radio IC circuitry can be provided for processing signals for each spectrum, although the scope of the embodiments is not limited in this respect.

In some embodiments, the synthesizer circuitry 1206d can be a fractional-N synthesizer or a fractional N/N+1 synthesizer, although the scope of the embodiments is not limited in this respect as other types of frequency synthesizers can be suitable. For example, synthesizer circuitry 1206d can be a delta-sigma synthesizer, a frequency multiplier, or a synthesizer comprising a phase-locked loop with a frequency divider.

The synthesizer circuitry 1206d can be configured to synthesize an output frequency for use by the mixer circuitry 1206a of the RF circuitry 1206 based on a frequency input and a divider control input. In some embodiments, the synthesizer circuitry 1206d can be a fractional N/N+1 synthesizer.

In some embodiments, frequency input can be provided by a voltage controlled oscillator (VCO), although that is not a constraint. Divider control input can be provided by either the baseband circuitry 1204 or the applications processor 1202 depending on the desired output frequency. In some embodiments, a divider control input (e.g., N) can be determined from a look-up table based on a channel indicated by the applications processor 1202.

Synthesizer circuitry 1206d of the RF circuitry 1206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1206 can include an IQ/polar converter.

FEM circuitry 1208 can include a receive signal path which can include circuitry configured to operate on RF signals received from one or more antennas 1010, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210.

In some embodiments, the FEM circuitry 1208 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE device 1200 can include additional elements such as, for example, memory/storage, display, camera, sensor, and/or input/output (I/O) interface.

Figure 13:
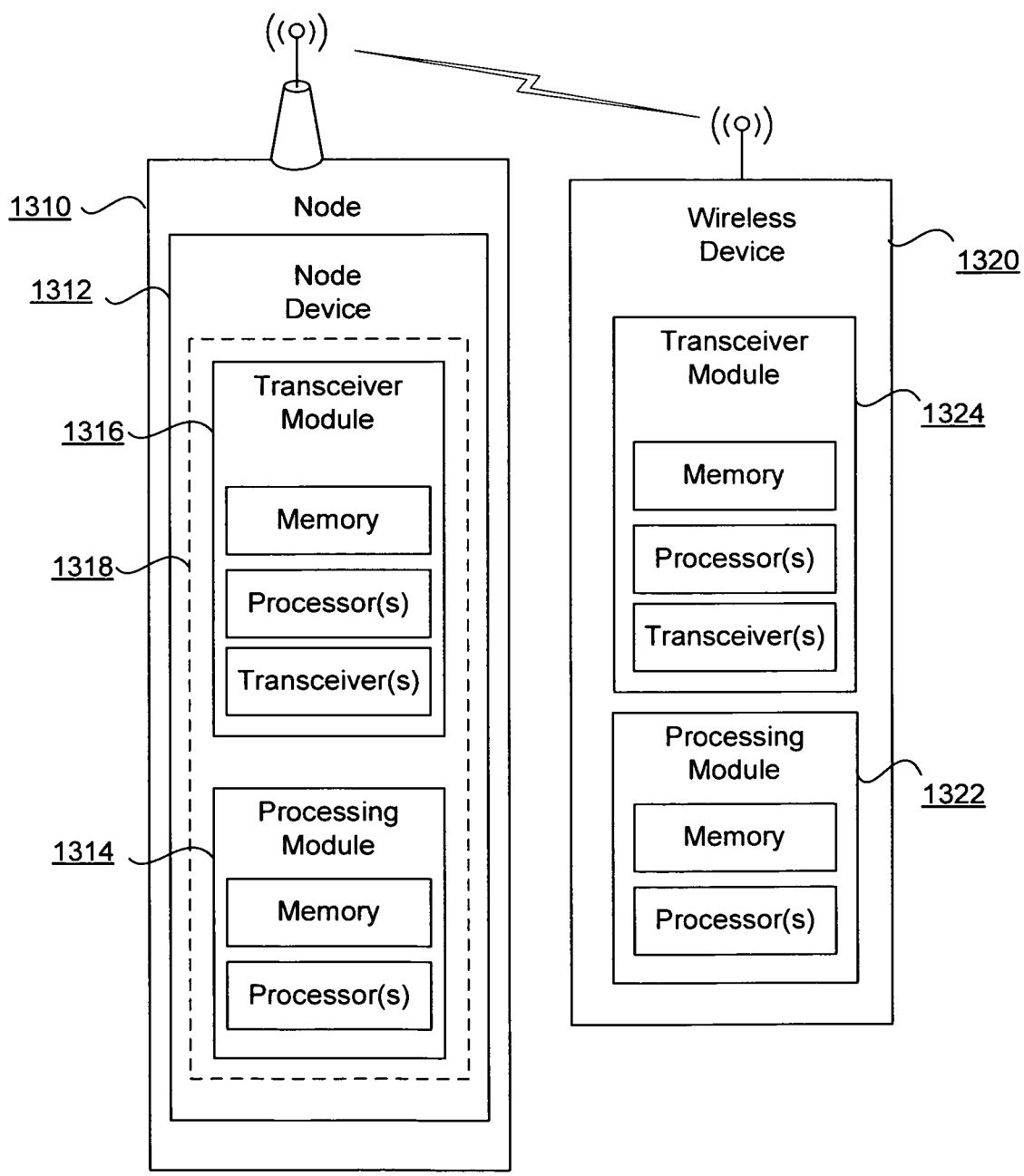
FIG. 13 illustrates a diagram of a node (e.g., base station and/or eNB) and wireless device (e.g., UE) in accordance with an example.

FIG. 13 illustrates a diagram 1300 of a node 1310 (e.g., eNB, a base station, an access point, and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). The node 1310 can include a node device 1312. The node device 1312 or the node 1310 can be configured to communicate with the wireless device 1320. The node device 1312 can be configured to implement the technology described. The node device 1312 can include a processing module 1314 and a transceiver module 1316. In one aspect, the node device 1312 can include the transceiver module 1316 and the processing module 1314 forming a circuitry 1318 for the node 1310. In one aspect, the transceiver module 1316 and the processing module 1314 can form a circuitry of the node device 1312. The processing module 1314 can include one or more processors and memory. In one embodiment, the processing module 1322 can include one or more application processors. The transceiver module 1316 can include a transceiver and one or more processors and memory. In one embodiment, the transceiver module 1316 can include a baseband processor.

The wireless device 1320 can include a transceiver module 1324 and a processing module 1322. The processing module 1322 can include one or more processors and memory. In one embodiment, the processing module 1322 can include one or more application processors. The transceiver module 1324 can include a transceiver and one or more processors and memory. In one embodiment, the transceiver module 1324 can include a baseband processor. The wireless device 1320 can be configured to implement the technology described. The node 1310 and the wireless devices 1320 can also include one or more storage mediums, such as the transceiver module 1316, 1324 and/or the processing module 1314, 1322. The wireless device 1320 can include a transceiver module 1324 and a processing module 1312. The wireless device 1320 can be configured to implement the technology described.

EXAMPLES

The following examples pertain to specific technology embodiments and point out specific features, elements, or steps that can be used or otherwise combined in achieving such embodiments.

Example 1 includes an apparatus of an eNodeB operable to perform enhanced overlaid code division multiple access (CDMA) to increase uplink (UL) transmission capacity for a mobile device, the apparatus comprising one or more processors and memory configured to: obtain channel quality conditions for mobile devices in a scheduling interval; identify a channel quality, a target transmission scheme, and a transmission power level for each of the mobile devices; assign each of the mobile devices a unique orthogonal CDMA code; force the mobile devices to transmit K repeated bursts of UL data that each have a rotated phase shift based on the unique orthogonal CDMA code assigned to each of the mobile devices, wherein K is a positive integer that is equal to or greater than a number of the mobile devices that are to have an overlaid CDMA operation performed thereon; process the K repeated bursts, received from the mobile devices, that are each multiplexed a same physical channel for overlaying the CDMA; and separate the mobile devices according to the unique orthogonal CDMA code and use in-phase (I) and quadrature-phase (Q) (IQ) accumulation according to combine the K repeated bursts.

Example 2 includes the apparatus of example 1, further configured to identify the mobile devices having channel quality conditions above a predefined threshold as compared to the mobile devices having channel quality conditions below the predefined threshold and that are capable of the overlaid CDMA, wherein the mobile devices forced to transmit K repeated bursts have channel quality conditions above the predefined threshold as compared to the mobile devices having channel quality conditions below a predefined threshold.

Example 3 includes the apparatus of example 1 or 2, further configured to force extended coverage devices and the mobile devices having channel quality conditions above the predefined threshold.

Example 4 includes the apparatus of example 1 or 2, further configured to perform a matching of the K repeated bursts transmitted by the extended coverage devices and the forced mobile devices having channel quality conditions above the predefined threshold.

Example 5 includes the apparatus of example 1 or 2, further configured to force extended coverage devices and only a portion of the mobile devices having channel quality conditions above the predefined threshold to transmit K repeated bursts.

Example 6 includes the apparatus of example 1, further configured to force extended coverage devices and a predefined number of the mobile devices having channel quality conditions above the predefined threshold.

Example 7 includes the apparatus of example 1 or 6, further configured to: buffer each of the K repeated bursts; or deploy a successive interference cancelation (SIC) scheme to sequentially process the received signals from an overlaid device.

Example 8 includes the apparatus of example 1, further configured to multiplex extended radio coverage mobile devices and the mobile devices forced to transmit the K repeated bursts simultaneously on a same set of radio resources using unique orthogonal CDMA codes.

Example 9 includes the apparatus of example 1 or 8, further configured to select a higher uplink Modulation and Coding Scheme (MCS) level for the mobile devices forced to transmit the K repeated bursts.

Example 10 includes the apparatus of example 1, further configured to select a same uplink Modulation and Coding Scheme (MCS) level for the mobile devices forced to transmit the K repeated bursts and using an accumulation of transmission power to increase the UL transmission reliability.

Example 11 includes the apparatus of example 1 or 10, further configured to process the K repeated bursts, received from the mobile devices, using a maximum transmission power by the mobile station.

Example 12 includes the apparatus of example 1, further configured to process the K repeated burst, received from the mobile devices, using a reduced transmission power.

Example 13 includes the apparatus of example 1 or 12, further configured to use a successive interference cancelation (SIC) scheme to sequentially process the received K repeated bursts according to signal strength of the K repeated bursts.

Example 14 includes the apparatus of example 1, wherein K is one of 2, 4, 8, or 16 or a positive integer greater than 1 based on a maximum number of blind repetitions in a system for the K repeated bursts.

Example 15 includes an apparatus of a mobile device operable to perform enhanced overlaid code division multiple access (CDMA) to increase uplink (UL) transmission capacity, the apparatus comprising one or more processors and memory configured to: process a unique orthogonal CDMA code, received from an eNodeB, that is assigned to the mobile device; repeatedly transmit K repeated bursts of UL data that are reach rotated by a phase shift based on the unique orthogonal CDMA code; and multiplex each of the K repeated bursts of the mobile device with other UL transmission of alternative mobile devices on a same physical channel for overlaying the CDMA, wherein K is a positive integer that is equal to or greater than a number of the mobile devices that are to have an overlaid CDMA operation performed thereon, separate the mobile devices according to the unique orthogonal CDMA code and use in-phase (I) and quadrature-phase (Q) (IQ) accumulation according to combine the K repeated bursts, wherein signals of the mobile devices can be separated at the receiver according to the unique orthogonal CDMA code and use IQ accumulation to combine the K repeated bursts.

Example 16 includes the apparatus of example 15, wherein the mobile devices that repeatedly transmit K repeated bursts of UL data have more efficient channel quality conditions as compared to other mobile devices that have less efficient channel quality conditions and that are capable of the overlaid CDMA, wherein the mobile devices are forced, by the eNodeB, to transmit K repeated bursts.

Example 17 includes the apparatus of example 16, wherein both the mobile device that repeatedly transmit K repeated bursts of UL data have more efficient channel quality conditions as compared to other mobile devices that have less efficient channel quality conditions and that are capable of the overlaid CDMA and extended coverage devices transmit K repeated bursts of UL data that are reach rotated by a phase shift based on the unique orthogonal CDMA code.

Example 18 includes the apparatus of example 15 or 17, further configured to buffer each of the K repeated bursts.

Example 19 includes the apparatus of example 15, further configured to multiplex extended radio coverage mobile devices and the mobile devices forced to transmit the K repeated bursts simultaneously on a same set of radio resources using unique orthogonal CDMA codes.

Example 20 includes the apparatus of example 15 or 19, further configured to process, for transmitting, the K repeated bursts in a higher uplink Modulation and Coding Scheme (MCS) level.

Example 21 includes the apparatus of example 15, further configured to process, for transmission, the K repeated bursts using a same uplink Modulation and Coding Scheme (MCS) level.

Example 22 includes the apparatus of example 15 or 21, further configured to process, for transmitting, the K repeated bursts using a maximum transmission power.

Example 23 includes the apparatus of example 15, further configured to process, for transmitting, the K repeated bursts using a reduced transmission power.

Example 24 includes the apparatus of example 15 or 22, wherein K is one of 2, 4, 8, or 16 or a positive integer greater than 1 based on a maximum number of blind repetitions in a system for the K repeated bursts.

Example 25 includes the apparatus of example 15, further configure to feedback to the eNodeB channel quality conditions, a target transmission scheme, and a transmission power level.

Example 26 includes the apparatus of example 15, wherein the apparatus includes at least one of an antenna, a touch sensitive display screen, a speaker, a microphone, a graphics processor, an application processor, internal memory, a non-volatile memory port, a baseband processor, and combinations thereof.

Example 27 includes at least one machine readable storage medium having instructions embodied thereon for performing enhanced overlaid code division multiple access (CDMA) to increase uplink (UL) transmission capacity with a mobile device, the instructions when executed by one or more processors and memory perform the following: identifying a channel quality, a target transmission scheme, and a transmission power level for each of the mobile devices; assigning each of the mobile devices a unique orthogonal CDMA code; forcing the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, wherein K is a positive integer that is equal to or greater than a number of the mobile devices that are to have an overlaid CDMA operation performed thereon; processing the K repeated bursts received from the mobile devices; and separating signals of the mobile devices according to the unique orthogonal CDMA code and use in-phase (I) and quadrature-phase (Q) (IQ) accumulation according to combine the K repeated bursts.

Example 28 includes the at least one machine readable storage medium of example 27, further comprising instructions which when executed by the one or more processors and memory performs the following: obtaining channel quality conditions for the mobile devices in a scheduling interval; and identify the mobile devices having more efficient channel quality conditions as compared to the mobile devices having less efficient channel quality conditions and that are capable of the overlaid CDMA, wherein the mobile devices forced to transmit K repeated bursts have the more efficient channel quality conditions as compared to those having less efficient channel quality conditions.

Example 29 includes the at least one machine readable storage medium of example 27 or 28, further comprising instructions which when executed by the one or more processors and memory performs the following: force the mobile devices having the more efficient channel quality conditions as compared to the mobile devices having less efficient channel quality conditions and extended coverage devices to transmit K repeated bursts, wherein K is one of 2, 4, 8, or 16 or a positive integer greater than 1 for the K repeated bursts.

Example 30 includes an apparatus of an eNodeB operable to perform enhanced overlaid code division multiple access (CDMA) to increase uplink (UL) transmission capacity for a mobile device, the apparatus comprising one or more processors and memory configured to: obtain channel quality conditions for mobile devices in a scheduling interval; identify a channel quality, a target transmission scheme, and a transmission power level for each of the mobile devices; assign each of the mobile devices a unique orthogonal CDMA code; force the mobile devices to transmit K repeated bursts of UL data that each have a rotated phase shift based on the unique orthogonal CDMA code assigned to each of the mobile devices, wherein K is a positive integer that is equal to or greater than a number of the mobile devices that are to have an overlaid CDMA operation performed thereon; process the K repeated bursts, received from the mobile devices, that are each multiplexed a same physical channel for overlaying the CDMA; and separate the mobile devices according to the unique orthogonal CDMA code and use in-phase (I) and quadrature-phase (Q) (IQ) accumulation according to combine the K repeated bursts.

Example 31 includes the apparatus of example 30, further configured to identify the mobile devices having channel quality conditions above a predefined threshold as compared to the mobile devices having channel quality conditions below the predefined threshold and that are capable of the overlaid CDMA, wherein the mobile devices forced to transmit K repeated bursts have channel quality conditions above the predefined threshold as compared to the mobile devices having channel quality conditions below a predefined threshold.

Example 32 includes the apparatus of example 31, further configured to force extended coverage devices and the mobile devices having channel quality conditions above the predefined threshold.

Example 33 includes the apparatus of example 31, further configured to perform a matching of the K repeated bursts transmitted by the extended coverage devices and the forced mobile devices having channel quality conditions above the predefined threshold.

Example 34 includes the apparatus of example 31, further configured to force extended coverage devices and only a portion of the mobile devices having channel quality conditions above the predefined threshold to transmit K repeated bursts.

Example 35 includes the apparatus of example 30, further configured to force extended coverage devices and a predefined number of the mobile devices having channel quality conditions above the predefined threshold.

Example 36 includes the apparatus of example 30, further configured to: buffer each of the K repeated bursts; or deploy a successive interference cancelation (SIC) scheme to sequentially process the received signals from an overlaid device.

Example 37 includes the apparatus of example 30, further configured to multiplex extended radio coverage mobile devices and the mobile devices forced to transmit the K repeated bursts simultaneously on a same set of radio resources using unique orthogonal CDMA codes.

Example 38 includes the apparatus of example 30, further configured to select a higher uplink Modulation and Coding Scheme (MCS) level for the mobile devices forced to transmit the K repeated bursts.

Example 39 includes the apparatus of example 30, further configured to select a same uplink Modulation and Coding Scheme (MCS) level for the mobile devices forced to transmit the K repeated bursts and using an accumulation of transmission power to increase the UL transmission reliability.

Example 40 includes the apparatus of example 30, further configured to process the K repeated bursts, received from the mobile devices, using a maximum transmission power by the mobile station.

Example 41 includes the apparatus of example 30, further configured to process the K repeated burst, received from the mobile devices, using a reduced transmission power.

Example 42 includes the apparatus of example 30, further configured to use a successive interference cancelation (SIC) scheme to sequentially process the received K repeated bursts according to signal strength of the K repeated bursts.

Example 43 includes the apparatus of example 30, wherein K is one of 2, 4, 8, or 16 or a positive integer greater than 1 based on a maximum number of blind repetitions in a system for the K repeated bursts.

Example 44 includes an apparatus of a mobile device operable to perform enhanced overlaid code division multiple access (CDMA) to increase uplink (UL) transmission capacity, the apparatus comprising one or more processors and memory configured to: process a unique orthogonal CDMA code, received from an eNodeB, that is assigned to the mobile device; repeatedly transmit K repeated bursts of UL data that are reach rotated by a phase shift based on the unique orthogonal CDMA code; and multiplex each of the K repeated bursts of the mobile device with other UL transmission of alternative mobile devices on a same physical channel for overlaying the CDMA, wherein K is a positive integer that is equal to or greater than a number of the mobile devices that are to have an overlaid CDMA operation performed thereon, separate the mobile devices according to the unique orthogonal CDMA code and use in-phase (I) and quadrature-phase (Q) (IQ) accumulation according to combine the K repeated bursts, wherein signals of the mobile devices can be separated at the receiver according to the unique orthogonal CDMA code and use IQ accumulation to combine the K repeated bursts.

Example 45 includes the apparatus of example 44, wherein the mobile devices that repeatedly transmit K repeated bursts of UL data have more efficient channel quality conditions as compared to other mobile devices that have less efficient channel quality conditions and that are capable of the overlaid CDMA, wherein the mobile devices are forced, by the eNodeB, to transmit K repeated bursts.

Example 46 includes the apparatus of example 45, wherein both the mobile device that repeatedly transmit K repeated bursts of UL data have more efficient channel quality conditions as compared to other mobile devices that have less efficient channel quality conditions and that are capable of the overlaid CDMA and extended coverage devices transmit K repeated bursts of UL data that are reach rotated by a phase shift based on the unique orthogonal CDMA code.

Example 47 includes the apparatus of example 44, further configured to buffer each of the K repeated bursts.

Example 48 includes the apparatus of example 44, further configured to multiplex extended radio coverage mobile devices and the mobile devices forced to transmit the K repeated bursts simultaneously on a same set of radio resources using unique orthogonal CDMA codes.

Example 49 includes the apparatus of example 44, further configured to process, for transmitting, the K repeated bursts in a higher uplink Modulation and Coding Scheme (MCS) level.

Example 50 includes the apparatus of example 44, further configured to process, for transmission, the K repeated bursts using a same uplink Modulation and Coding Scheme (MCS) level.

Example 51 includes the apparatus of example 44, further configured to process, for transmitting, the K repeated bursts using a maximum transmission power.

Example 52 includes the apparatus of example 44, further configured to process, for transmitting, the K repeated bursts using a reduced transmission power.

Example 53 includes the apparatus of example 44, wherein K is one of 2, 4, 8, or 16 or a positive integer greater than 1 based on a maximum number of blind repetitions in a system for the K repeated bursts.

Example 54 includes the apparatus of example 44, further configure to feedback to the eNodeB channel quality conditions, a target transmission scheme, and a transmission power level.

Example 55 includes the apparatus of example 44, wherein the apparatus includes at least one of an antenna, a touch sensitive display screen, a speaker, a microphone, a graphics processor, an application processor, internal memory, a non-volatile memory port, a baseband processor, and combinations thereof.

Example 56 includes one or more transitory or non-transitory machine readable storage mediums having instructions embodied thereon for performing enhanced overlaid code division multiple access (CDMA) to increase uplink (UL) transmission capacity with a mobile device, the instructions when executed by one or more processors and memory perform the following: identifying a channel quality, a target transmission scheme, and a transmission power level for each of the mobile devices; assigning each of the mobile devices a unique orthogonal CDMA code; forcing the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, wherein K is a positive integer that is equal to or greater than a number of the mobile devices that are to have an overlaid CDMA operation performed thereon; processing the K repeated bursts received from the mobile devices; and separating signals of the mobile devices according to the unique orthogonal CDMA code and use in-phase (I) and quadrature-phase (Q) (IQ) accumulation according to combine the K repeated bursts.

Example 57 includes the one or more transitory or non-transitory machine readable storage mediums of example 56, further comprising instructions which when executed by the one or more processors and memory performs the following: obtaining channel quality conditions for the mobile devices in a scheduling interval; and identify the mobile devices having more efficient channel quality conditions as compared to the mobile devices having less efficient channel quality conditions and that are capable of the overlaid CDMA, wherein the mobile devices forced to transmit K repeated bursts have the more efficient channel quality conditions as compared to those having less efficient channel quality conditions.

Example 58 includes the one or more transitory or non-transitory machine readable storage mediums of claim 57, further comprising instructions which when executed by the one or more processors and memory performs the following: force the mobile devices having the more efficient channel quality conditions as compared to the mobile devices having less efficient channel quality conditions and extended coverage devices to transmit K repeated bursts, wherein K is one of 2, 4, 8, or 16 or a positive integer greater than 1 for the K repeated bursts.

Example 59 includes an apparatus of an eNodeB operable to perform enhanced overlaid code division multiple access (CDMA) to increase uplink (UL) transmission capacity for a mobile device, the apparatus comprising one or more processors and memory configured to: obtain channel quality conditions for mobile devices in a scheduling interval; identify a channel quality, a target transmission scheme, and a transmission power level for each of the mobile devices; assign each of the mobile devices a unique orthogonal CDMA code; force the mobile devices to transmit K repeated bursts of UL data that each have a rotated phase shift based on the unique orthogonal CDMA code assigned to each of the mobile devices, wherein K is a positive integer that is equal to or greater than a number of the mobile devices that are to have an overlaid CDMA operation performed thereon; process the K repeated bursts, received from the mobile devices, that are each multiplexed a same physical channel for overlaying the CDMA; and separate the mobile devices according to the unique orthogonal CDMA code and use in-phase (I) and quadrature-phase (Q) (IQ) accumulation according to combine the K repeated bursts.

Example 60 includes the apparatus of example 59, further configured to: identify the mobile devices having channel quality conditions above a predefined threshold as compared to the mobile devices having channel quality conditions below the predefined threshold and that are capable of the overlaid CDMA, wherein the mobile devices forced to transmit K repeated bursts have channel quality conditions above the predefined threshold as compared to the mobile devices having channel quality conditions below a predefined threshold; force extended coverage devices and the mobile devices having channel quality conditions above the predefined threshold; perform a matching of the K repeated bursts transmitted by the extended coverage devices and the forced mobile devices having channel quality conditions above the predefined threshold; force extended coverage devices and only a portion of the mobile devices having channel quality conditions above the predefined threshold to transmit K repeated bursts; or force extended coverage devices and a predefined number of the mobile devices having channel quality conditions above the predefined threshold.

Example 61 includes the apparatus of example 59 or 60, further configured to: buffer each of the K repeated bursts; deploy a successive interference cancelation (SIC) scheme to sequentially process the received signals from an overlaid device; multiplex extended radio coverage mobile devices and the mobile devices forced to transmit the K repeated bursts simultaneously on a same set of radio resources using unique orthogonal CDMA codes; select a higher uplink Modulation and Coding Scheme (MCS) level for the mobile devices forced to transmit the K repeated bursts; or select a same uplink Modulation and Coding Scheme (MCS) level for the mobile devices forced to transmit the K repeated bursts and using an accumulation of transmission power to increase the UL transmission reliability.

In Example 62, the subject matter of Example 59 or any of the Examples described herein may further be configured to: process the K repeated bursts, received from the mobile devices, using a maximum transmission power by the mobile station; process the K repeated burst, received from the mobile devices, using a reduced transmission power; or use a successive interference cancelation (SIC) scheme to sequentially process the received K repeated bursts according to signal strength of the K repeated bursts.

In Example 63, the subject matter of Example 59 or any of the Examples described herein may further include, wherein K is one of 2, 4, 8, or 16 or a positive integer greater than 1 based on a maximum number of blind repetitions in a system for the K repeated bursts.

Example 64 includes an apparatus of a mobile device operable to perform enhanced overlaid code division multiple access (CDMA) to increase uplink (UL) transmission capacity, the apparatus comprising one or more processors and memory configured to: process a unique orthogonal CDMA code, received from an eNodeB, that is assigned to the mobile device; repeatedly transmit K repeated bursts of UL data that are reach rotated by a phase shift based on the unique orthogonal CDMA code; and multiplex each of the K repeated bursts of the mobile device with other UL transmission of alternative mobile devices on a same physical channel for overlaying the CDMA, wherein K is a positive integer that is equal to or greater than a number of the mobile devices that are to have an overlaid CDMA operation performed thereon, separate the mobile devices according to the unique orthogonal CDMA code and use in-phase (I) and quadrature-phase (Q) (IQ) accumulation according to combine the K repeated bursts, wherein signals of the mobile devices can be separated at the receiver according to the unique orthogonal CDMA code and use IQ accumulation to combine the K repeated bursts.

Example 65 includes the apparatus of example 64, wherein the mobile devices that repeatedly transmit K repeated bursts of UL data have more efficient channel quality conditions as compared to other mobile devices that have less efficient channel quality conditions and that are capable of the overlaid CDMA, wherein the mobile devices are forced, by the eNodeB, to transmit K repeated bursts.

Example 66 includes the apparatus of example 65, wherein both the mobile device that repeatedly transmit K repeated bursts of UL data have more efficient channel quality conditions as compared to other mobile devices that have less efficient channel quality conditions and that are capable of the overlaid CDMA and extended coverage devices transmit K repeated bursts of UL data that are reach rotated by a phase shift based on the unique orthogonal CDMA code.

Example 67 includes the apparatus of example 64-66, further configured to: buffer each of the K repeated bursts; multiplex extended radio coverage mobile devices and the mobile devices forced to transmit the K repeated bursts simultaneously on a same set of radio resources using unique orthogonal CDMA codes.

In Example 68, the subject matter of Example 64 or any of the Examples described herein may further be configured to process, for transmitting, the K repeated bursts in a higher uplink Modulation and Coding Scheme (MCS) level.

In Example 69, the subject matter of Example 64 or any of the Examples described herein may further be configured to process, for transmission, the K repeated bursts using a same uplink Modulation and Coding Scheme (MCS) level.

In Example 70, the subject matter of Example 64 or any of the Examples described herein may further be configured to process, for transmitting, the K repeated bursts using a maximum transmission power or using a reduced transmission power.

In Example 71, the subject matter of Example 64 or any of the Examples described herein may further include, wherein K is one of 2, 4, 8, or 16 or a positive integer greater than 1 based on a maximum number of blind repetitions in a system for the K repeated bursts.

In Example 72, the subject matter of Example 64 or any of the Examples described herein may further be configured to feedback to the eNodeB channel quality conditions, a target transmission scheme, and a transmission power level.

In Example 73, the subject matter of Example 64 or any of the Examples described herein may further be configured to, wherein the apparatus includes at least one of an antenna, a touch sensitive display screen, a speaker, a microphone, a graphics processor, an application processor, internal memory, a non-volatile memory port, a baseband processor, and combinations thereof.

Example 74 includes a device for performing enhanced overlaid code division multiple access (CDMA) to increase uplink (UL) transmission capacity, the device comprising: means for identifying a channel quality, a target transmission scheme, and a transmission power level for each of the mobile devices; means for assigning each of the mobile devices a unique orthogonal CDMA code; means for forcing the mobile devices to transmit K repeated bursts of UL data that each have a rotated phase shift based on the unique orthogonal CDMA code assigned to each of the mobile devices with each of the mobile devices multiplexed on a same physical channel for overlaying transmitted signals of the mobile devices, wherein K is a positive integer that is equal to or greater than a number of the mobile devices that are to have an overlaid CDMA operation performed thereon; means for processing the K repeated bursts received from the mobile devices; and means for separating signals of the mobile devices according to the unique orthogonal CDMA code and use in-phase (I) and quadrature-phase (Q) (IQ) accumulation according to combine the K repeated bursts.

Example 75 includes the device of example 74, further comprising: means for obtaining channel quality conditions for the mobile devices in a scheduling interval; and means for identify the mobile devices having more efficient channel quality conditions as compared to the mobile devices having less efficient channel quality conditions and that are capable of the overlaid CDMA, wherein the mobile devices forced to transmit K repeated bursts have the more efficient channel quality conditions as compared to those having less efficient channel quality conditions.

Example 76 includes the device of claim 75, further comprising means for forcing the mobile devices having the more efficient channel quality conditions as compared to the mobile devices having less efficient channel quality conditions and extended coverage devices to transmit K repeated bursts, wherein K is one of 2, 4, 8, or 16 or a positive integer greater than 1 for the K repeated bursts.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor) shared, dedicated, or group), and/or memory(shared, dedicated, or group) that execute one or more software or firmware programs, acombinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a base station configured for overlaid code division multiple access (CDMA) in an extended coverage global system for mobile (GSM)/enhanced data rates for GSM evolution (EDGE) radio access network, the apparatus comprising:
one or more processors configured to:
assign, at the base station, a different orthogonal code to each mobile station in a group of mobile stations when overlaid CDMA is implemented at the base station;
assign, at the base station, a same set of physical resources to be used by the group of mobile stations for multiplexed blind physical layer uplink transmissions using the different orthogonal code assigned to each mobile station;
encode, at the base station, the different orthogonal codes for transmission to the group of mobile stations; and
decode, at the base station, the multiplexed blind physical layer uplink transmissions received from the group of mobile stations on the same set of physical resources based on the different orthogonal code assigned to each mobile station,
wherein there is no restriction, based on different channel quality, on mobile stations that are included in the group of mobile stations and use the same set of physical resources to perform the blind physical layer uplink transmissions, and
memory configured to store the different orthogonal code for each mobile station in the group of mobile stations.

2. The apparatus of claim 1, further comprising a transceiver configured to transmit the different orthogonal codes to the group of mobile stations.

3. The apparatus of claim 1, further comprising a transceiver configured to receive the blind physical layer uplink transmissions from the group of mobile stations.

4. The apparatus of claim 1, wherein the one or more processors are configured to configure a mobile station in the group of mobile stations to apply the different orthogonal code per uplink burst, wherein each uplink burst has a phase shift based on the different orthogonal code assigned to the mobile station by the base station.

5. The apparatus of claim 1, wherein the one or more processors are configured to configure a mobile station in the group of mobile stations to apply the different orthogonal code to a defined number of uplink bursts, wherein the defined number of uplink bursts includes four uplink bursts.

6. The apparatus of claim 1, wherein the group of mobile stations includes up to four mobile stations.

7. The apparatus of claim 1, wherein the group of mobile stations includes mobile stations of different classes.

8. An apparatus of a mobile station configured for overlaid code division multiple access (CDMA), the apparatus comprising:
one or more processors configured to:
decode, at the mobile station, a unique orthogonal code received from a base station, wherein the mobile station is included in a group of mobile stations that are multiplexed on a same set of physical resources when overlaid CDMA is utilized at the mobile station;
apply, at the mobile station, the unique orthogonal code assigned to the mobile station to a blind physical layer uplink transmission from the mobile station; and
encode, at the mobile station, the blind physical layer uplink transmission for delivery to the base station using the same set of physical resources for the multiplexed group of mobile stations; and
memory configured to store the unique orthogonal code received from the base station.

9. The apparatus of claim 8, further comprising a transceiver configured to:

receive the unique orthogonal code from the base station; and send the blind physical layer uplink transmission to the base station.

10. The apparatus of claim 8, wherein the one or more processors are configured to apply the unique orthogonal code per uplink burst of the blind physical layer uplink transmission, wherein each uplink burst has a phase shift based on the unique orthogonal code assigned to the mobile station by the base station.

11. The apparatus of claim 8, wherein the one or more processors are configured to apply the unique orthogonal code to a defined number of uplink bursts corresponding to the blind physical layer uplink transmission, wherein the defined number of uplink bursts includes four uplink bursts.

12. The apparatus of claim 8, wherein the group of mobile stations includes up to four mobile stations.

13. The apparatus of claim 8, wherein the group of mobile stations includes mobile stations of different coverage classes.

14. At least one non-transitory machine readable storage medium comprising instructions embodied thereon, the instructions when executed by one or more processors cause a base station to perform the following:

assigning, at the base station, a unique orthogonal code to each mobile station in a group of mobile stations when overlaid code division multiple access (CDMA) is implemented at the base station;

assigning, at the base station, a same set of physical resources to be used by the group of mobile stations for multiplexed blind physical layer uplink transmissions using the different orthogonal code assigned to each mobile station;

encoding, at the base station, the different orthogonal codes for transmission to the group of mobile stations; and decoding, at the base station, the multiplexed blind physical layer uplink transmissions received from the group of mobile stations on the same set of physical resources based on the different orthogonal code assigned to each mobile station, wherein there is no restriction, based on different channel quality, on mobile stations that are included in the group of mobile stations and use the same set of physical resources to perform the blind physical layer uplink transmissions.

15. The at least one non-transitory machine readable storage medium of claim 14, further comprising instructions which when executed by the one or more processors cause the base station to perform the following: configuring a mobile station in the group of mobile stations to apply the unique orthogonal code per uplink burst, wherein each uplink burst has a phase shift based on the unique orthogonal code assigned to the mobile station by the base station.

16. The at least one non-transitory machine readable storage medium of claim 14, further comprising instructions which when executed by the one or more processors cause the base station to perform the following: configuring a mobile station in the group of mobile stations to apply the unique orthogonal code to a defined number of uplink bursts, wherein the defined number of uplink bursts includes four uplink bursts.

17. The at least one non-transitory machine readable storage medium of claim 14, wherein the group of mobile stations includes up to four mobile stations.

18. The at least one non-transitory machine readable storage medium of claim 14, wherein the group of mobile stations includes mobile stations of different coverage classes.

19. At least one non-transitory machine readable storage medium comprising instructions embodied thereon, the instructions when executed by one or more processors of a mobile station cause the mobile station to perform the following:

decoding, at the mobile station, a unique orthogonal code received from a base station, wherein the mobile station is included in a group of mobile stations that are multiplexed on a same set of physical resources when overlaid code division multiple access (CDMA) is utilized at the mobile station;

applying, at the mobile station, the unique orthogonal code assigned to the mobile station to a blind physical layer uplink transmission from the mobile station; and encoding, at the mobile station, the blind physical layer uplink transmission for delivery to the base station using the same set of physical resources for the multiplexed group of mobile stations.

20. The at least one non-transitory machine readable storage medium of claim 19, further comprising instructions which when executed by the one or more processors cause the mobile station to perform the following: applying the unique orthogonal code per uplink burst of the blind physical layer uplink transmission, wherein each uplink burst has a phase shift based on the unique orthogonal code assigned to the mobile station by the base station.

21. The at least one non-transitory machine readable storage medium of claim 19, further comprising instructions which when executed by the one or more processors cause the mobile station to perform the following: applying the unique orthogonal code to a defined number of uplink bursts corresponding to the blind physical layer uplink transmission, wherein the defined number of uplink bursts includes four uplink bursts.

22. The at least one non-transitory machine readable storage medium of claim 19, wherein the group of mobile stations includes up to four mobile stations.

23. The at least one non-transitory machine readable storage medium of claim 19, wherein the group of mobile stations includes mobile stations of different coverage classes.

* * * * *